US008259856B2

(12) United States Patent
Wang et al.

(10) Patent No.: US 8,259,856 B2
(45) Date of Patent: Sep. 4, 2012

(54) METHOD, APPARATUS, AND COMPUTER PROGRAM PRODUCT FOR DECODING SIGNALS IN A WIRELESS COMMUNICATION ENVIRONMENT

(75) Inventors: Huan-Chuan Wang, Taipei (TW); De-Jhen Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 688 days.

(21) Appl. No.: 12/409,770

(22) Filed: Mar. 24, 2009

(65) Prior Publication Data

US 2010/0246731 A1 Sep. 30, 2010

(51) Int. Cl.
*H03K 9/06* (2006.01)
*H03D 1/04* (2006.01)

(52) U.S. Cl. ........................................ 375/316; 375/341

(58) Field of Classification Search .......... 375/259–260, 375/262, 273, 279, 329, 341, 316; 369/59.22; 370/281, 295, 302, 343, 480–481, 341; 714/746, 714/786, 794

See application file for complete search history.

(56) References Cited

U.S. PATENT DOCUMENTS 8,116,242 B2 * 2/2012 Thomas et al. ............... 370/310
2005/0111566 A1 5/2005 Park et al.
2005/0111592 A1 * 5/2005 Yee ............................... 375/341
2007/0286313 A1 * 12/2007 Nikopour-Deilami et al. ............................ 375/341
2008/0019331 A1 * 1/2008 Thomas et al. ............... 370/338
2008/0069185 A1 * 3/2008 Elezabi ......................... 375/144
2008/0298479 A1 12/2008 Wang et al.
2008/0310554 A1 * 12/2008 Siti et al. ........................ 375/340
2010/0040177 A1 * 2/2010 Dick et al. ..................... 375/341

OTHER PUBLICATIONS

Litwin, L. et al., *RF Signal Processing*, www.rfdesign.com, Jan. 2001, pp. 30-48.

Tran, X. N. et al., *Performance Comparison of MMSE-SIC and MMSE-ML Multiuser Detectors in a STBC-OFDM System*, Personal Indoor and Mobile Radio Communications, PIMRC 2005, IEEE 16$^{th}$ International Symposium, (Sep. 2005) 5 pages.

* cited by examiner

*Primary Examiner* — Lawrence B Williams
(74) *Attorney, Agent, or Firm* — Alston & Bird LLP

(57) ABSTRACT

An apparatus for decoding a received plurality of multi-path signals to recover the data content of transmitted signals may include an integrated circuit. The integrated circuit may be configured to generate a logarithm likelihood ratio based on a received plurality of multi-path signals, where the received plurality of multi-path signals is representative of transmitted data content. The integrated circuit may be further configured to arrange coefficients of an expression generated based on the received plurality of multi-path signals and integrate the expression. The integrated circuit may be further configured to divide the integrated expression by prior information. As a result, the integrated circuit may be configured to receive the plurality of multi-path signals and decode the signals via integration. Associated methods and computer program products may also be provided.

23 Claims, 18 Drawing Sheets

$$F^q = \begin{bmatrix} f^q_{1,1} & f^q_{1,2} & \cdots & f^q_{1,N} & f^q_{1,N+1} \\ f^k_{2,1} & & & & \\ \vdots & & & \vdots & \vdots \\ f^q_{N,1} & & \cdots & f^q_{N,N} & f^q_{N,N+1} \\ f^q_{N+1,1} & & \cdots & f^q_{N+1,N} & f^q_{N+1,N+1} \end{bmatrix} = \begin{bmatrix} f^q_{1,1} & f^q_{1,2} & \cdots & f^q_{1,N} & f^q_{1,N+1} \\ f^k_{2,1} & & & & \\ \vdots & & & \vdots & \vdots \\ f^q_{N,1} & & \cdots & f^q_{N,N} & f^q_{N,N+1} \\ f^q_{N+1,1} & & \cdots & f^q_{N+1,N} & f^q_{N+1,N+1} \end{bmatrix}$$

$F^q \qquad F^{q,(N)}$ $\int \cdot dV_0 \searrow \qquad \Bigg\lvert \int\!\!\!\int\!\!\!\int \cdot$ $$F^{q,(N-1)} = \begin{bmatrix} 0 & 0 & \cdots & 0 & 0 \\ 0 & f^{q,(N-1)}_{2,2} & \cdots & f^{q,(N-1)}_{2,N} & f^{q,(N-1)}_{2,N+1} \\ \vdots & \vdots & & \vdots & \vdots \\ 0 & f^{q,(N-1)}_{N,2} & \cdots & f^{q,(N-1)}_{N,N} & f^{q,(N-1)}_{N,N+1} \\ 0 & f^{q,(N-1)}_{N+1,1} & \cdots & f^{q,(N-1)}_{N+1,N} & f^{q,(N-1)}_{N+1,N+1} \end{bmatrix} \xrightarrow{\int \cdot dV_1} F^{q,(N-2)} = \begin{bmatrix} 0 & 0 & \cdots & 0 & 0 \\ 0 & 0 & \cdots & 0 & f^{q,(N-2)}_{2,N+1} \\ 0 & f^{q,(N-2)}_{3,3} & \cdots & f^{q,(N-2)}_{3,N+1} \\ \vdots & \vdots & & \vdots \\ 0 & f^{q,(N-2)}_{N+1,3} & \cdots & f^{q,(N-2)}_{N+1,N+1} \end{bmatrix} \cdots \begin{bmatrix} 0 & 0 & \cdots & 0 & 0 \\ & & & & f^{q,(1)}_{N,N+1} \\ & & & f^{q,(1)}_{N,N} & f^{q,(1)}_{N,N+1} \\ & & & f^{q,(1)}_{N+1,N} & f^{q,(1)}_{N+1,N+1} \end{bmatrix}$$

$F^{q,(N-1)} \qquad F^{q,(N-2)} \qquad F^{q,(1)}$

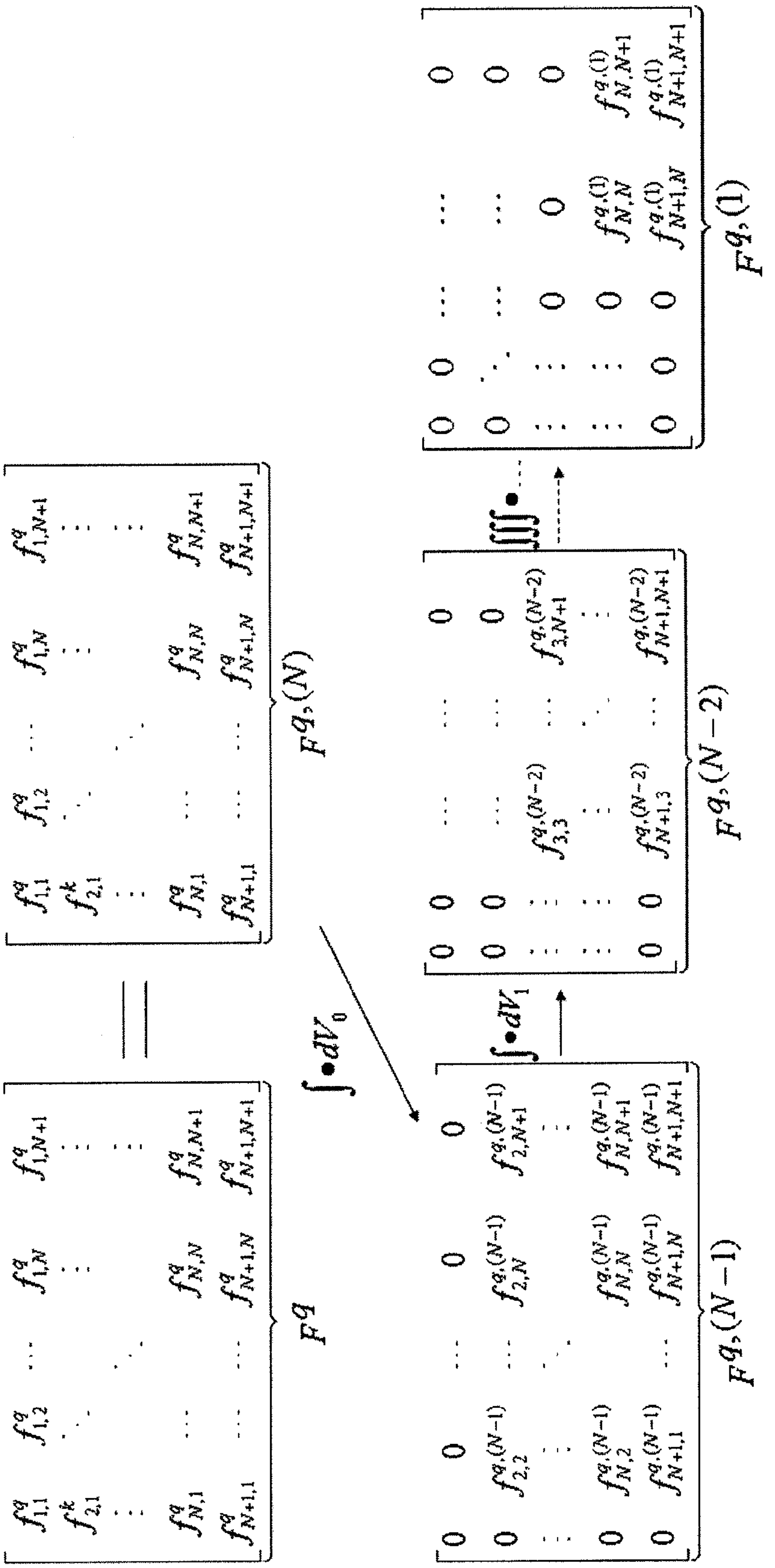

FIG.2

Original Evaluation (N=4)

| | $\int \bullet dv_1$ | $\int \bullet dv_2$ | $\int \bullet dv_3$ | $\int \bullet dv_4$ |
|---|---|---|---|---|
| evaluation $p\left(y^q \mid x_1^q = v_1\right)$ | X | 1 | 2 | 3 |
| evaluation $p\left(y^q \mid x_2^q = v_2\right)$ | 4 | X | 5 | 6 |
| evaluation $p\left(y^q \mid x_3^q = v_3\right)$ | 7 | 8 | X | 9 |
| evaluation $p\left(y^q \mid x_4^q = v_4\right)$ | 10 | 11 | 12 | X |

X Not Need Integration

N Need Integration (N means order of integration)

FIG. 3

Complexity Reduction Evaluation (N=4)

| | $\int \bullet dv_1$ | $\int \bullet dv_2$ | $\int \bullet dv_3$ | $\int \bullet dv_4$ |
|---|---|---|---|---|
| evaluation $p(y^q \mid x_1^q = v_1)$ | ✗ | 5 | 3 | 4 |
| evaluation $p(y^q \mid x_2^q = v_2)$ | 6 | ✗ | ✗ | 7 |
| evaluation $p(y^q \mid x_3^q = v_3)$ | 1 | 2 | ✗ | ✗ |
| evaluation $p(y^q \mid x_4^q = v_4)$ | 1 | 2 | 8 | ✗ |

✗ Not Need Integration

[N] Need Integration (N means order of integration)

Complexity Reduction Evaluation (N=8)

| | $\int \cdot dv_1$ | $\int \cdot dv_2$ | $\int \cdot dv_3$ | $\int \cdot dv_4$ | $\int \cdot dv_5$ | $\int \cdot dv_6$ | $\int \cdot dv_7$ | $\int \cdot dv_8$ |
|---|---|---|---|---|---|---|---|---|
| evaluation $p(y^q \mid x_1^q = v_1)$ | X | 18 | | | | | | |
| evaluation $p(y^q \mid x_2^q = v_2)$ | 17 | X | | | | | | |
| evaluation $p(y^q \mid x_3^q = v_3)$ | 9 | 10 | 19 | | | | | |
| evaluation $p(y^q \mid x_4^q = v_4)$ | | | X | 20 | | | | |
| evaluation $p(y^q \mid x_5^q = v_5)$ | 1 | 2 | 3 | 4 | | 22 | | |
| evaluation $p(y^q \mid x_6^q = v_6)$ | | | | | 21 | X | | |
| evaluation $p(y^q \mid x_7^q = v_7)$ | | | | | X | | 15 | |
| evaluation $p(y^q \mid x_8^q = v_8)$ | | | | | 13 | 14 | X | 16 |

| | $\int \cdot dv_1$ | $\int \cdot dv_2$ | $\int \cdot dv_3$ | $\int \cdot dv_4$ | $\int \cdot dv_5$ | $\int \cdot dv_6$ | $\int \cdot dv_7$ | $\int \cdot dv_8$ |
|---|---|---|---|---|---|---|---|---|
| evaluation $p(y^q \mid x_1^q = v_1)$ | X | 18 | | | | | | |
| evaluation $p(y^q \mid x_2^q = v_2)$ | 17 | X | | | | | | |
| evaluation $p(y^q \mid x_3^q = v_3)$ | 9 | 10 | 19 | | | | | |
| evaluation $p(y^q \mid x_4^q = v_4)$ | | | X | 20 | | | | |
| evaluation $p(y^q \mid x_5^q = v_5)$ | 1 | 2 | 3 | 4 | 5 | | | |
| evaluation $p(y^q \mid x_6^q = v_6)$ | | | | | X | 22 | | |
| evaluation $p(y^q \mid x_7^q = v_7)$ | | | | | 21 | X | 15 | |
| evaluation $p(y^q \mid x_8^q = v_8)$ | | | | | 13 | 14 | 23 | 16, 24 |

X  Not Need Integration

[N]  Need Integration (N means order of integration)

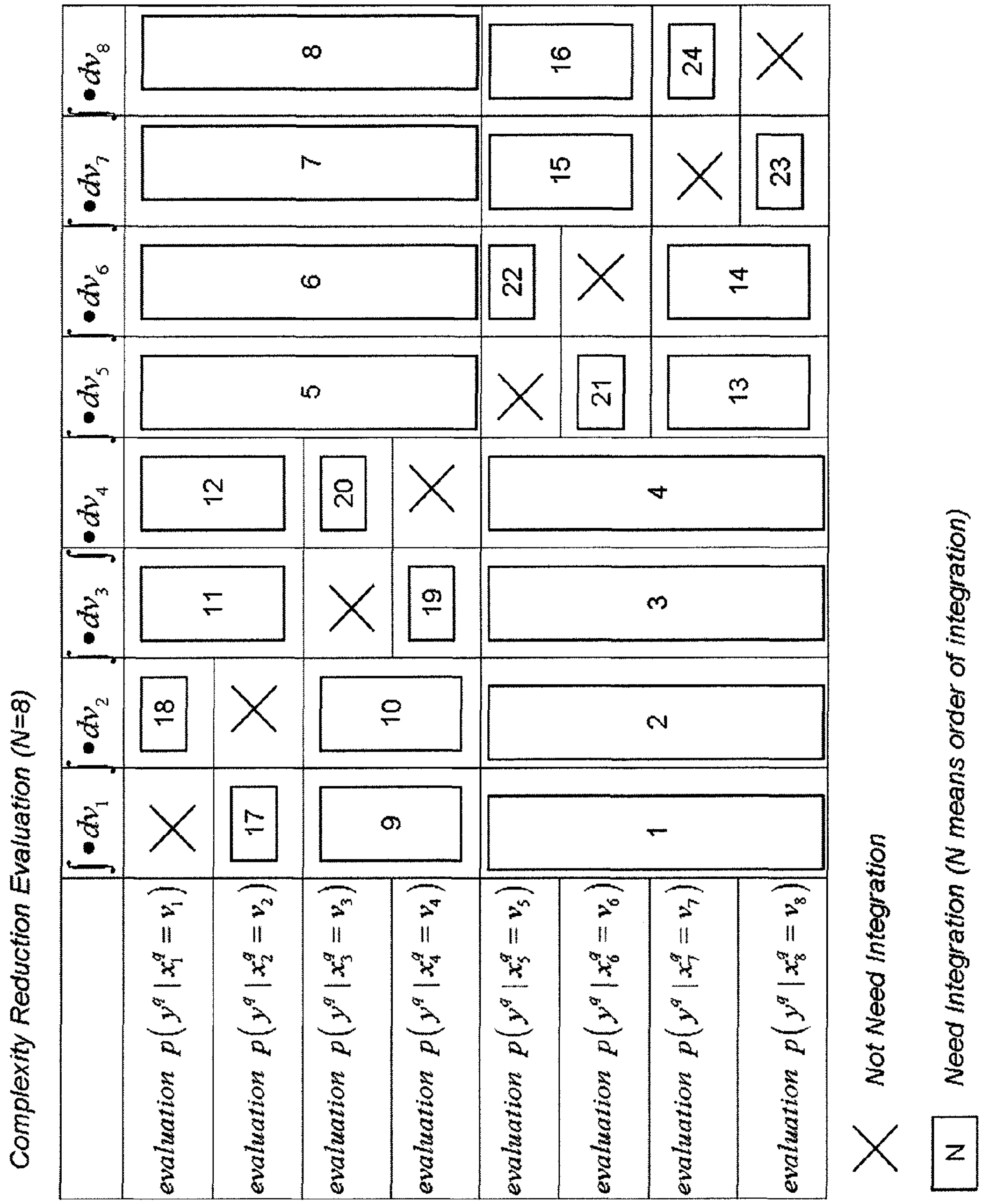

FIG.5

METHOD, APPARATUS, AND COMPUTER PROGRAM PRODUCT FOR DECODING SIGNALS IN A WIRELESS COMMUNICATION ENVIRONMENT

TECHNICAL FIELD

Embodiments of the present invention relate generally to communication of data, and, more particularly, relate to a method, apparatus, and computer program product for decoding signals in a multiple-input multiple-output environment.

BACKGROUND

The modern communications era has brought about a tremendous expansion of wireless networks. Various types of networking technologies have been developed resulting in unprecedented expansion of wireless computer networks, television networks, telephony networks, and the like, fueled by consumer demand. Wireless and mobile networking technologies have addressed related consumer demands, while providing more flexibility and immediacy of information transfer. However, in order to continue to meet the increasing demands of consumers for fast and reliable wireless communications, wireless networking technologies must continue to evolve.

The evolution of wireless communications appears to be moving toward the implementation of multiple-input multiple-output (MIMO) environments. MIMO environments incorporate the use of multiple transmitting and receiving antennas to broadcast and detect multi-path signals. MIMO environments utilize multi-path signals in a manner that can effectively increase the bandwidth of communications within a MIMO channel. MIMO environments may also be coupled with orthogonal frequency division multiplexing (OFDM) techniques to further increase the bandwidth afforded by a MIMO channel.

However, signals transmitted in MIMO environments, with or without OFDM, can be computationally complex to decode. Often conventional decoding schemes allow for increased error rates to minimize the complexity of decoding. In situations where increased error rates cannot be tolerated, decoding can become a bottleneck of the communications channel thereby reducing the throughput of the channel. As such, it is desirable to identify decoding schemes that are computationally less complex than conventional decoding schemes, but also provide for decreased error rates over convention solutions.

BRIEF SUMMARY

A method, apparatus, and computer program product are described for decoding signals in a MIMO environment. In this regard, example embodiments of the present invention decode received multi-path signals using a lower complexity mechanism than conventional solutions that also results in a decreased error rate. Example embodiments of the present invention generate a logarithm likelihood ratio expression based on a received plurality of multi-path signals. Example embodiments arrange the coefficients of an expression based on the signals and integrate the result. The integrated expression is then divided by prior information. The prior information may be information previously determined or information that is already known. Dividing by the prior information may facilitate the decoding the multi-path signals and recover the data content of the transmitted multi-path signals.

In one example embodiment of the present invention, a method for decoding signals in a MIMO environment is provided. The method may include receiving a plurality of multi-path signals and inputting representations of the received multi-path signals into an expression. In this regard, the plurality of multi-path signals may be representations of transmitted data content. The method may further include arranging coefficients of the expression, integrating the expression, and dividing the expression by prior information to generate a result. The method may further include generating a logarithm likelihood ratio expression based on the prior information and the result to thereby decode the received plurality of multi-path signals and recover the data content.

In another example embodiment of the present invention, an integrated circuit for decoding signals in a MIMO environment is provided. The integrated circuit may comprise probability evaluation circuitry that receives representations of a plurality of multi-path signals and generates an expression based on the representations of multi-path signals and prior information. The integrated circuit may also include butterfly interleaving integration circuitry that generates two or more groups based on the expression, performs a concatenation of the non-group member in each group, and performs a butterfly interleaving integration of each group to generate an integrated expression. The integrated circuit may also include dividing integrated expression circuitry that divides the integrated expression by the prior information to generate a result and logarithmic likelihood ratio circuitry that generates a logarithm likelihood ratio expression based on the result to thereby decode the received plurality of multi-path signals and recover data content.

In yet another example embodiment of the present invention, a computer program product for decoding signals in a MIMO environment is provided. The computer program product may include at least one computer-readable storage medium having executable computer-readable program code instructions stored therein. The computer-readable program code instructions may be configured to receive a plurality of multi-path signals and input representations of the received multi-path signals into an expression. In this regard, the plurality of multi-path signals may be representations of transmitted data content. The computer-readable program code instructions may be further configured to arrange coefficients of the expression, integrate the expression, and divide the expression by prior information to generate a result. The computer-readable program code instructions may also be configured to generate a logarithm likelihood ratio expression based on the prior information and the result to thereby decode the received plurality of multi-path signals and recover the data content.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is an illustration of an integration process according to various example embodiments of the present invention;

FIG. 3 is a table describing integration operations according to various example embodiments of the present invention;

FIG. 5 is a table describing grouped integration operations according to various example embodiments of the present invention;

Figure 16A:
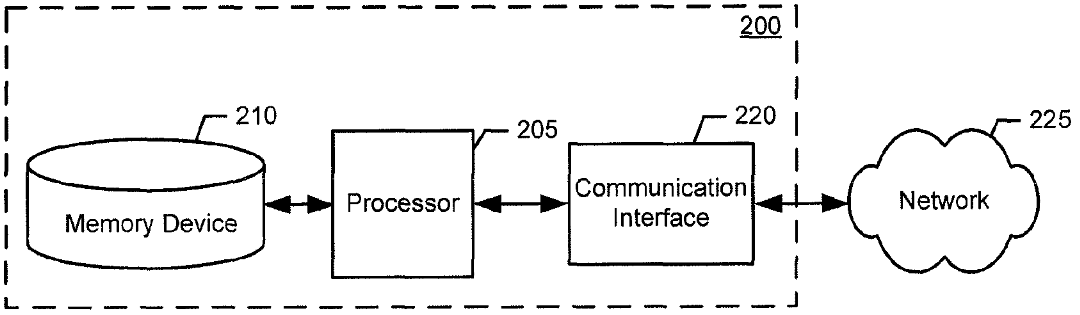
Figure 16B:
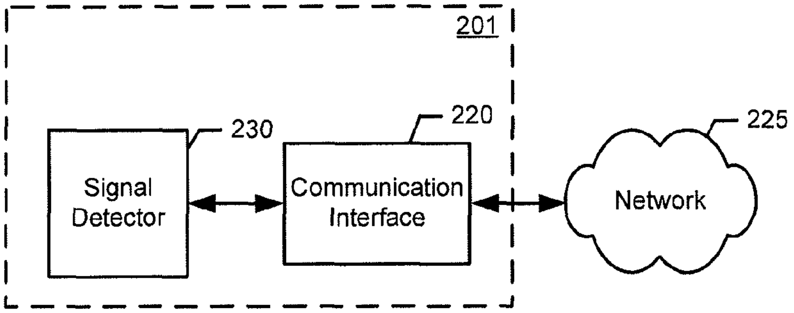
Figure 16C:
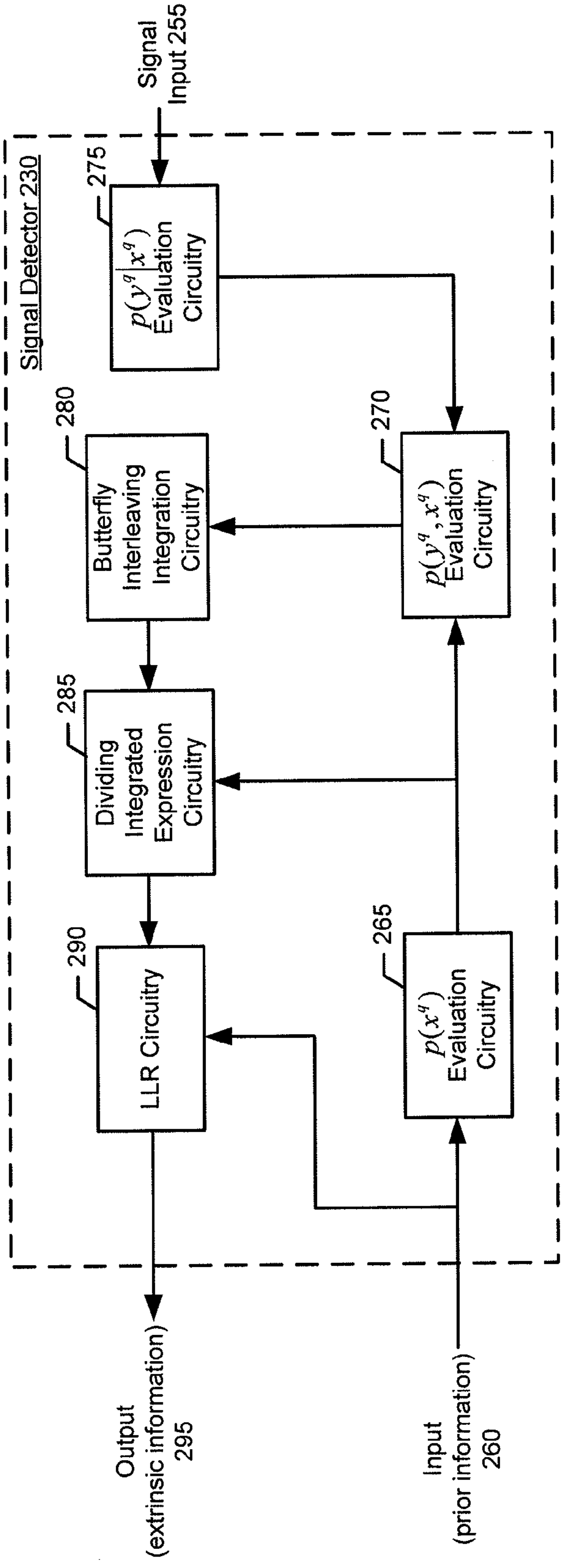
Figure 17:
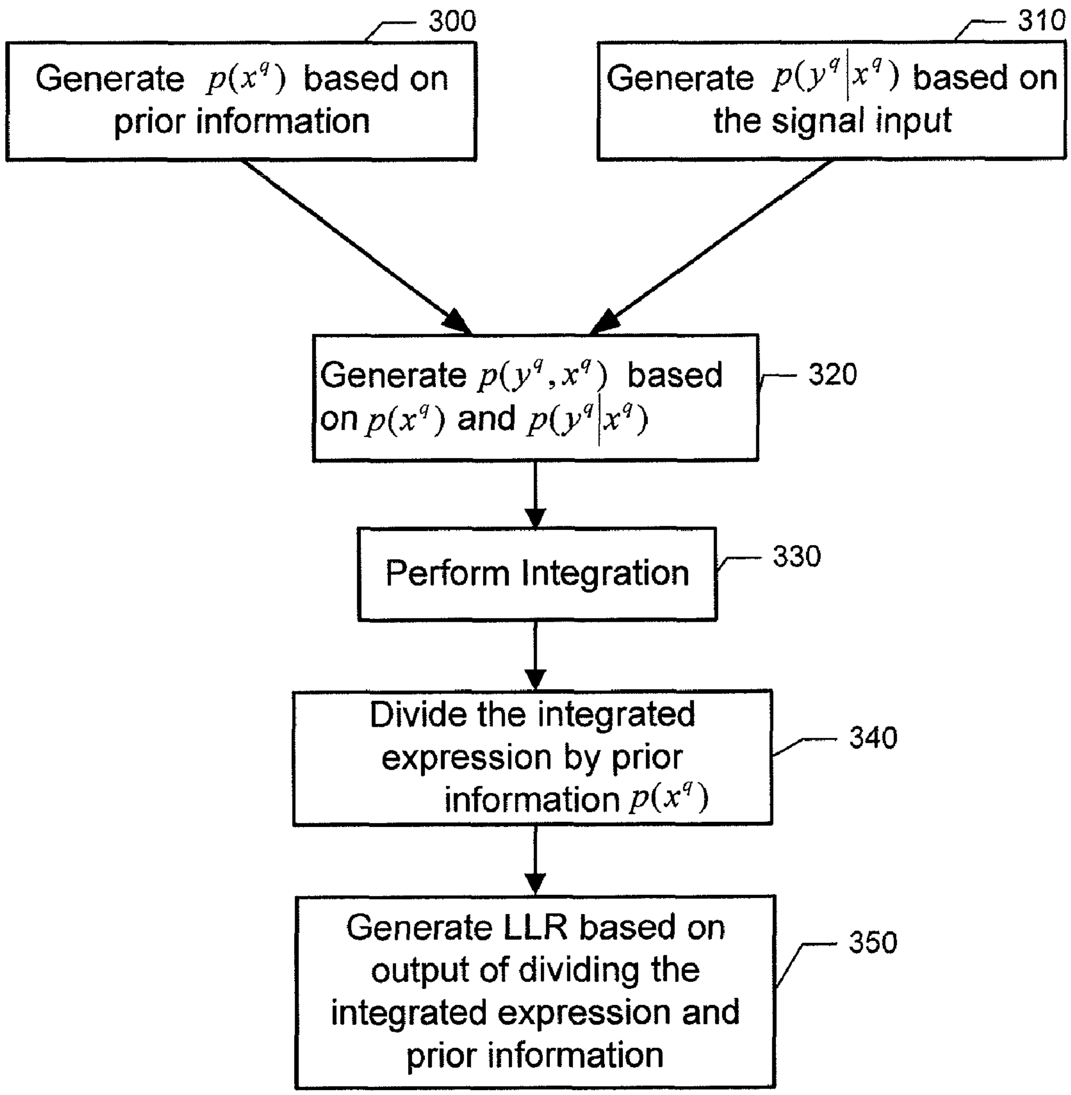

FIGS. 16*a*-16*c* are schematic block diagrams depicting apparatuses for signal detection or decoding according to various example embodiments of the present invention; and FIG. 17 is a flowchart of a method for signal decoding according to various example embodiments of the present invention.

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

The decoding technique described herein may be utilized in environments that operate using multiple antennas at the transmission side of a communication channel or the reception side of a communication channel. Example embodiments of the present invention may therefore be applied to multiple-input multiple-output environments (MIMO) environments, and environments implementing orthogonal frequency division multiplexing (OFDM) communications techniques. While the description below addresses example embodiments of the present invention in MIMO systems, one of skill in the art would also appreciate that the techniques described herein are also applicable in pre-coded OFDM environments.

A MIMO environment may be described by the expression $y^q=H^qx^q+n^q$. In this regard, the received signal or signals may be represented by $y^q$ where $y^q=[y_1^q \ldots y_N^q]^T$. When received by a receiver, a coded block length may be long relative to the length of a received signal $y^q$. In some example embodiments, a complete coded block may need to be transmitted many times. For example, if a coded block length is 1024 bits and $y^q$ is N bits (where N is the number of receive antennas and the number of transmit antennas), $y^q$ may need to be received 1024/N times. Therefore, 1024/N sub-blocks may make up a complete coded block. In this regard, q indicates the qth sub-block in the complete coded length.

Further, $H^q$ represents the MIMO channel, which may be described as an N×N channel where N represents the number of receive antennas and the number of transmit antennas. In matrix form, $H^q$ may be expressed as $$H^q = \begin{bmatrix} h_{1,1}^q & h_{1,2}^q & \cdots & h_{1,N}^q \\ h_{2,1}^q & \ddots & & \vdots \\ \vdots & & \ddots & h_{N-1,N}^q \\ h_{N,1}^q & & h_{N,N-1}^q & h_{N,N}^q \end{bmatrix}.$$

Further, $x^q$ may represent the transmitted signal where $x^q=[x_1^q \ldots x_N^q]^T$. Noise, which may include interference, in the MIMO system may be represented by $n^q$, where $n^q=[n^{0q}\ n_1^q \ldots n_{N-1}^q]$. According to various example embodiments, the received signals $y^q$ and the noise $n^q$ may be assumed to have a Gaussian distribution. Further, according to some example embodiments, the noise may be complex additive Gaussian white noise and the transmitted signal $x^q$ may be a binary phase shift keying (BPSK) signal. In some example embodiments, the transmitted signal may also be assumed to have a Gaussian distribution.

As further described herein, the expression for the MIMO environment may be solved to determine or decode the data content of the transmitted signal $x^q$ based on the received signal or signals $y^q$. In this regard, example embodiments of the present invention operate to cancel the noise component to determine the data content of the transmitted signal.

In an example process for decoding the data content of a transmitted signal $x^q$, a plurality of received signals $y^q$ may be expressed in the form of a logarithm likelihood ratio (LLR) expression. The LLR may be used to find the ratio of $x_i^q=+1$ to $x_i^q=-1$. In this regard, the LLR expression may be written as $$L(x_i^q) = \ln\frac{p(x_i^q = +1 \mid y^q)}{p(x_i^q = -1 \mid y^q)},$$

where p(a|b) is the probability of a occurring given that b has occurred. This LLR expression may be separated into a first portion that may be attributed to extrinsic information added to a second portion that may be attributed to prior information. That is, $$L(x_i^q) = \ln\frac{p(y^q \mid x_i^q = +1)}{p(y^q \mid x_i^q = -1)} + \ln\frac{p(x_i^q = +1)}{p(x_i^q = -1)}, \text{ where } \ln\frac{p(y^q \mid x_i^q = +1)}{p(y^q \mid x_i^q = -1)}$$

is representative of extrinsic information and $$\ln\frac{p(x_i^q = +1)}{p(x_i^q = -1)}$$

is representative of prior information. On the other words, in this detecting algorithm, extrinsic information $$\ln\frac{p(y^q \mid x_i^q = +1)}{p(y^q \mid x_i^q = -1)}$$

is the output, and the prior information $$\ln\frac{p(x_i^q = +1)}{p(x_i^q = -1)}$$

is one of the inputs. Accordingly, $p(x^q)$ and $p(y^q|x^q)$ may be determined and combined to form $p(y^q, x^q)$, which may be integrated and expressed as the LLR described above.

Further, the extrinsic information may be related to a distribution of $p(y^q|x_i^q)$. In example embodiments where it is assumed that the extrinsic information is a Gaussian function, the extrinsic information may be expressed as $$p(y^q \mid x_i^q = v_i) = \frac{\displaystyle\int\!\!\int\!\!\int_{v_1 \ldots v_{i-1} v_{i+1} \ldots v_N} \prod_{j=1}^{N} p(y_j^q \mid x^q = V) \cdot \prod_{k=1}^{N} p(x_k^q = v_k) \cdot dv_1 \ldots dv_{i-1} dv_{i+1} \ldots dv_N}{p(x_i^q = v_i)}$$

where $V=[v_1 \ldots v_N]$ is column vector and $v_i (i=1 \ldots N)$ is a random variable. This expression may then be simplified by arranging the coefficients $$\prod_{j=1}^{N} p(y_j^q \mid x^q = V) \cdot \prod_{k=1}^{N} p(x_k^q = v_k),$$

performing the integration, and dividing by the prior information $p(x_i^q=v_i)$, which may be determined based on experience or empirical information.

Arranging the coefficients $$\prod_{j=1}^{N} p(y_j^q \mid x^q = V) \cdot \prod_{k=1}^{N} p(x_k^q = v_k)$$

may be performed by first assuming that $p(y_j^q|x^q=V)$ and $p(x_k^q=v_k)$ have a Gaussian distribution. In other words, $$\begin{aligned} p(x^q = V) &= C' \cdot \exp\{-[V - E[x^q]]^* [\mathrm{var}[x^q]]^{-1} [V - E[x^q]]\} \\ &= C' \cdot \exp\left\{-[V^* \ 1] \begin{bmatrix} [\mathrm{var}[x^q]]^{-1} & [\mathrm{var}[x^q]]^{-1} \cdot E[x^q] \\ (E[x^q])^* \cdot [\mathrm{var}[x^q]]^{-1} & (E[x^q])^* \cdot [\mathrm{var}[x^q]]^{-1} \cdot E[x^q] \end{bmatrix} \begin{bmatrix} V \\ 1 \end{bmatrix}\right\} \\ &= C' \cdot \exp\left\{-[V^* \ 1] \begin{bmatrix} \sum_{i=1}^{N} \frac{1}{\mathrm{var}[x_k^q]} \cdot e_i e_i^* & -\sum_{k=1}^{N} \frac{E[x_k^q]}{\mathrm{var}[x_k^q]} e_k \\ -\sum_{k=1}^{N} \frac{(E[x_k^q])^*}{\mathrm{var}[x_k^q]} (e_k)^* & \sum_{k=1}^{N} \frac{|E[x_k^q]|^2}{\mathrm{var}[x_k^q]} \end{bmatrix} \begin{bmatrix} V \\ 1 \end{bmatrix}\right\} \text{ and} \end{aligned}$$

$$\begin{aligned} p(y^q|x^q = V) &= C' \cdot \exp\left\{-\frac{1}{N_0}[y - H^q V]^* [y - H^q V]\right\} \\ &= C' \cdot \exp\left\{-\frac{1}{N_0}(V^* (H^q)^* H^q V - y^* H^q V - V^* (H^q)^* y + y^* y)\right\} \\ &= C' \cdot \exp\left\{-\frac{1}{N_0}\left([V^* \ 1] \begin{bmatrix} (H^q)^* H^q & -(H^q)^* y \\ -y^* H^q & y^* y \end{bmatrix} \begin{bmatrix} V \\ 1 \end{bmatrix}\right)\right\} \end{aligned}$$

where * means Hermitian, where $N_0$ is the power of noise $n^q$, which may be known or estimated by receiver. $E[x^q]$ and $[\mathrm{var}[x^q]]$ is the prior information of $x_k^q$, which may be known or estimated before decoding. Since, in some example embodiments, the power to the variables $v_1 \ldots v_N$ will be not more than two, the coefficients may be arranged in accordance with the following equation, where C is a constant:

$$p(y^q \mid x_i^q = v_i) = \frac{\displaystyle\int\!\!\int\!\!\int_{v_1 \ldots v_{i-1} v_{i+1} \ldots v_N} C \cdot \exp\left\{-\frac{1}{N_0}[V^T \ 1] F^q \begin{bmatrix} V \\ 1 \end{bmatrix}\right\} \cdot dv_1 \ldots dv_{i-1} dv_{i+1} \ldots dv_N}{C' \cdot \exp\{-[v_i - E[x_i^q]]^* [\mathrm{var}[x_i^q]]^{-1} [v_i - E[x_i^q]]\}}$$

where $$F^q = \begin{bmatrix} (H^q)^T H^q & -(H^q)^T y \\ -y^T H^q & y^T y \end{bmatrix} + N_0 \begin{bmatrix} \sum_{i=1}^{N} \frac{1}{\mathrm{var}[x_k^q]} \cdot e_i e_i^T & -\sum_{k=1}^{N} \frac{E[x_k^q]}{\mathrm{var}[x_k^q]} e_k \\ \sum_{k=1}^{N} \frac{(E[x_k^q])^T}{\mathrm{var}[x_k^q]} e_k^T & \sum_{k=1}^{N} \frac{|E[x_k^q]|^2}{\mathrm{var}[x_k^q]} \end{bmatrix}.$$

Having arranged the coefficients, the simplification may continue by performing the integration. According to various example embodiments, the integration may be performed with respect to $F^q$. In an example integration where N=3 (number of receive antennas and transmit antennas), the process continues by integrating $$\int_{-\infty}^{\infty} e^{-\left([v^* \ 1] \cdot F^{q,(w)} \cdot \begin{bmatrix} V \\ 1 \end{bmatrix}\right)} dv_2 = C' e^{-\left(\left([v^* \ 1] \cdot F^{q,(w-1)} \cdot \begin{bmatrix} V \\ 1 \end{bmatrix}\right)\right)}.$$

Figure 1:
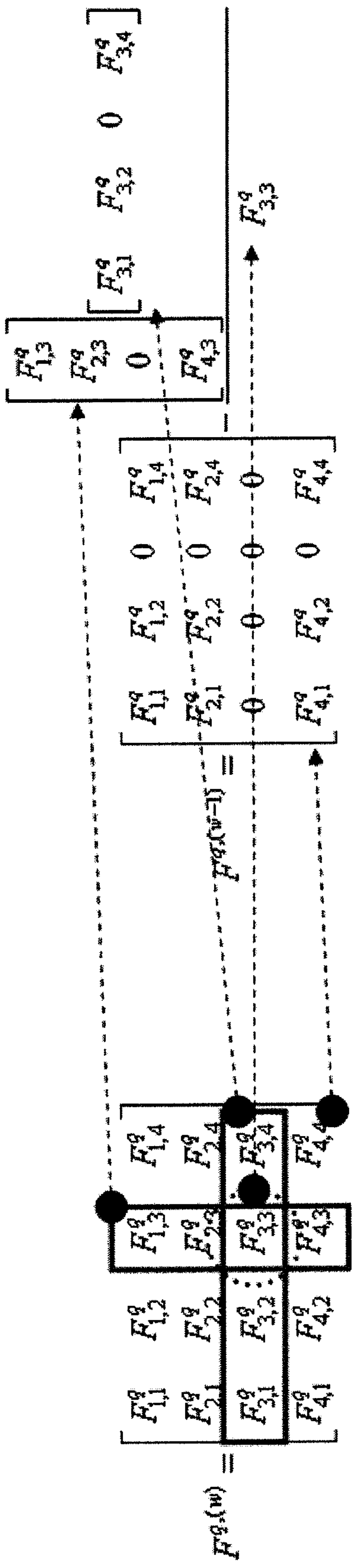
FIG. 1 is an illustration of the separation of a coefficient matrix to facilitate integration of the matrix according to various example embodiments of the present invention.

As such, as seen in FIG. 1, the matrix $F^{q,(w)}$ may be separated into four portions to determine $F^{q,(w-1)}$. As such, $F^{q,(w-1)}$ may be a quadratic matrix and the integral of $F^{q,(w-1)}$ may be $F^q$. The relation between $F^q$ and $F^{q,(w-1)}$ may therefore be $$F^{q,(w-1)} = \begin{cases} F_{i,j}^{q,(w)} - \dfrac{F_{i,2}^{q,(w)} \cdot F_{2,j}^{q,(w)}}{F_{2,2}^{q,(w)}}, & i \neq 2, \ j \neq 2 \\ 0, & \text{otherwise.} \end{cases}$$

Referring to FIG. 1, the element $F_{3,3}^q$, in the third row and third column, may be moved to the denominator position for the fraction in the right-hand portion of the equation. To form the numerator of the same fraction, the other elements in the third row may be multiplied by the remaining elements in the third column, where the element $F_{3,3}^{q}$ is replaced with a zero. Note that all of the elements of the third row and third column are the coefficients of $v_2$. The matrix including the remaining elements of the matrix $F^{q,(w)}$, with the elements of the third row and column replaced by zeros, may be the minuend and the generated fraction may be subtrahend of a subtraction operation. Using this form as seen in FIG. 1, computations may be performed to generate the matrix $F^{q,(w-1)}$, which results in an integrated matrix via a single integration operation.

The integrated matrix $F^{q(w-1)}$ may also be written as $$F^{q,(w-1)} = \begin{cases} F_{i,j}^{q,(w)} - \dfrac{F_{i,3}^{q,(w)} \cdot F_{3,j}^{q,(w)}}{F_{3,3}^{q,(w)}}, & i \neq 3,\ j \neq 3 \\ 0, & \text{otherwise,} \end{cases}$$

wherein the third row and the third column are zeros. As a result of the computation process during integration, an increasing number of variables become zero. Therefore, after N integration operations, the variable that is to be evaluated remains. In other words, with respect to $$p(y^q \mid x_i^q = v_i) = \frac{\displaystyle\iiint_{v_1 \ldots v_{i-1} v_{i+1} \ldots v_N} \prod_{j=1}^{N} p(y_j^q \mid x^q = V) \cdot \prod_{k=1}^{N} p(x_k^q = v_k) \cdot dv_1 \ldots dv_{i-1} dv_{i+1} \ldots dv_N}{p(x_i^q = v_i)},$$

the desired variable or signal may be $p(y^q|x_i^q)$.

Considering, for example, multi-times integration, the following expression may be evaluated $$\iiint_{v_1 \ldots v_{N-1}} \prod_{j=1}^{N} p(y_j^q \mid x^q = V) \cdot \prod_{k=1}^{N} p(x_j^q = v_k) \cdot dv_1 \ldots dv_{N-1}.$$

By integrating this expression by order ($dv_1 \cdot dv_2 \ldots dv_{N-1}$), the number of zeros in the resultant matrix will increase as depicted in FIG. 2. In this example, four nonzero elements may remain the in matrix, as a result of the elements in the Nth row and/or column being coefficients for $V_N$. The lower right-hand corner element may be constant.

This integration process may involve performing an integration for each symbol N−1 times. Since there are N total symbols, the number of total integrations may be N(N−1). FIG. 3 depicts a table describing the integrations needed for evaluating an environment where N=4. Note that 12 integrations are performed to evaluate the expression. The x's indicate relationships where no integration is needed and the rectangles in the table indicate relationships where an integration is performed. The numbering of the rectangles in the table of FIG. 3 depicts an order for performing the integrations. As such, the integration may be performed by first performing the integrations with respect to $p(y^q|x_1^q=v_1)$, and then performing the integrations with respect to $p(y^q|x_2^q=v_2)$, and so on.

Example embodiments of the present invention may simplify the integration process such that a lesser number of integration operations are required. In this regard, duplicated operations may be identified in the integration performed in, for example, the integration process described with respect to FIG. 3. Referring again to FIG. 3, the integration operations 2 and 5 may be performed together as a single integration. The same may be true for integration operations 3 and 6, 7 and 10, and 8 and 11.

Figure 4:
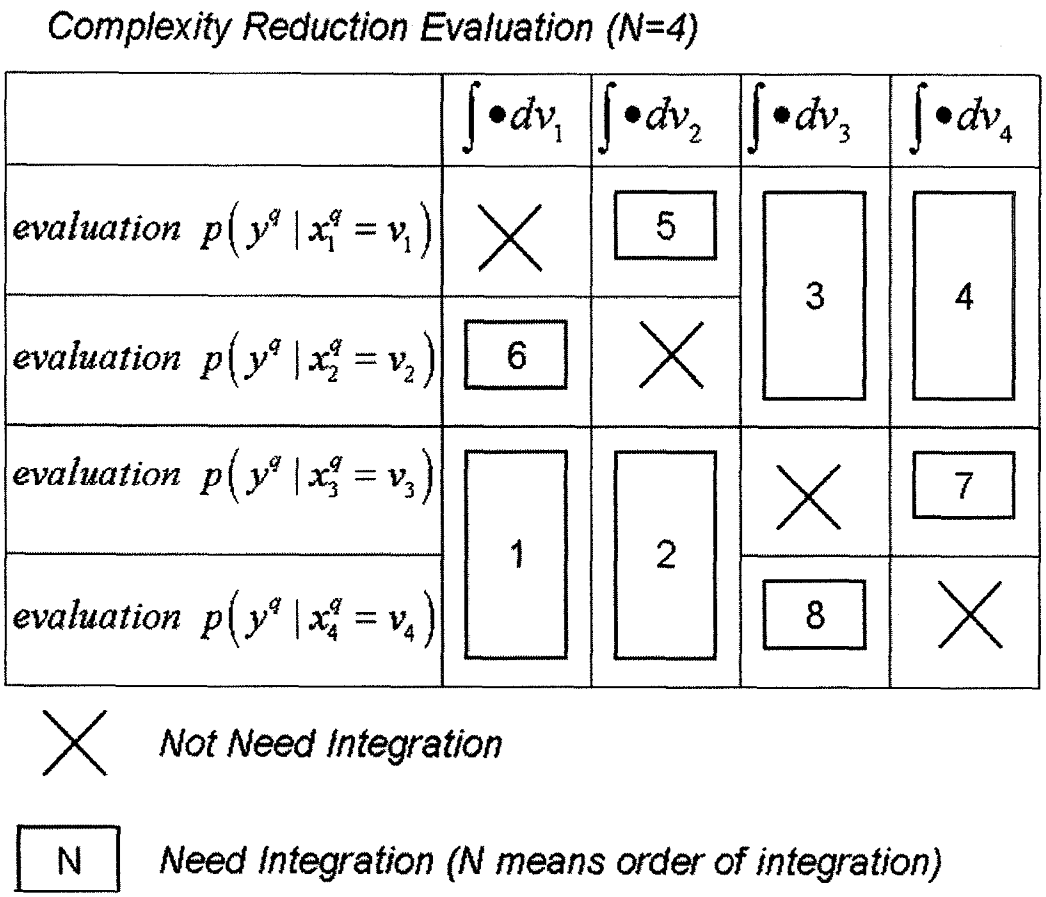
FIG. 4 is a table describing grouped integration operations according to various example embodiments of the present invention.
Figure 6:
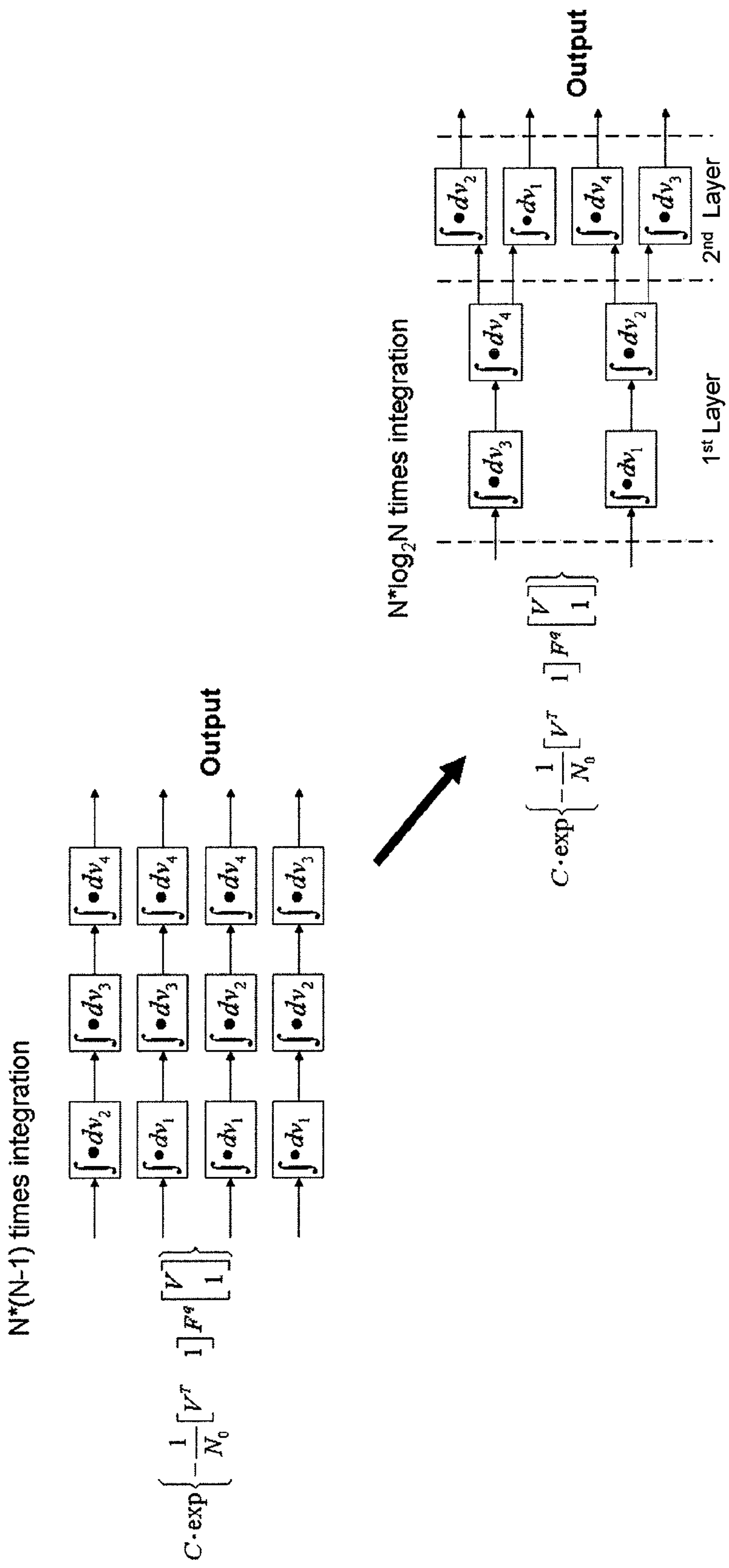
FIG. 6 is an illustration of the procedure for grouping integration operations according to various example embodiments of the present invention.

FIG. 4 depicts a table illustrating the reduced number of integrations as described above, where the duplicated operations are grouped as a single integration operation. The integration operations for $p(y^q|x_1^q=v_1)$ and $p(y^q|x_2^q=v_2)$ for $dv_3$ and $dv_4$ may be grouped as a set, and the integration operations for $p(y^q|x_1^q=v_3)$ and $p(y^q|x_4^q=v_4)$ for $dv_1$ and $dv_2$ may be grouped as another set. By grouping the integration operations in this manner, the number of integrations may be reduced by a factor of N $\log_2$ N.

As another example of the integration grouping process, FIG. 5 illustrates a table of integration operations for an environment where N=8. Based on the foregoing, integration operations for $p(y^q|x_1^q=v_1)$ through $p(y^q|x_4^q=v_4)$ may be grouped as a set, and integration operations for $p(y^q|x_5^q=v_5)$ and $p(y^q|x_8^q=v_8)$ may be grouped as another set. Other smaller grouping may also be identified as depicted in FIG. 5. Having completed the integration procedure, the result of arranging the coefficients and integrating, may be divided by prior information $p(x_i^q=v_i)$. For clarity, it may be assumed that the result of arranging the coefficients and integrating results, in the expression $$\iiint_{v_1 \ldots v_{i-1} v_{i+1} \ldots v_N} e^{-f^q(v_1 \ldots v_N)} \cdot dv_1 \ldots dv_{i-1} dv_{i+1} \ldots dv_N = C' e^{-(\zeta_{i,1}|v_i|^2 - (\zeta_{i,2})^* v_i - \zeta_{i,2}(v_i)^* + \zeta_{i,3})},$$

where $\zeta_{i,1}$, $\zeta_{i,2}$, and $\zeta_{i,3}$ are coefficients for $|V_i|^2$, $V_i^1$, and $V_i^0$, respectively. Upon dividing the expression by the prior information $p(x_i^q=v_i)$, the expression may be arranged as a Gaussian function in the form of $$p(y^q \mid x_i^q = V_i) = C'' \frac{e^{-(\zeta_{i,0}|V_i|^2 - (\zeta_{i,1})^* V_i - \zeta_{i,1}(V_i)^* + \zeta_{i,2})}}{e^{-\left(\frac{1}{(\sigma_{x_i^q})^2}|V_i|^2 - \frac{(\mu_{x_i^q})^*}{(\sigma_{x_i^q})^2} V_i - \frac{\mu_{x_i^q}}{(\sigma_{x_i^q})^2}(V_i)^* + \frac{|\mu_{x_i^q}|^2}{(\sigma_{x_i^q})^2}\right)}} = C''' e^{\frac{|V_i - \mu_{x_i^q,new}|^2}{(\sigma_{x_i^q,new})^2}},$$

where the average is $$\mu_{x_i^q,new} = \frac{(\sigma_{x_i^q})^2 \zeta_{i,2} - \mu_{x_i^q}}{(\sigma_{x_i^q})^2 \zeta_{i,1} - 1}$$

and the variance is $$(\sigma_{x_i^q,new})^2 = \frac{(\sigma_{x_i^q})^2}{(\sigma_{x_i^q})^2 \zeta_{i,1} - 1}.$$

The following equation may then be evaluated:

$$L(x_i^q) = \ln\frac{p(y^q \mid x_i^q = +1)}{p(y^q \mid x_i^q = -1)} + \ln\frac{p(x_i^q = +1)}{p(x_i^q = -1)} =$$

$$\ln\frac{C''' e^{\frac{|-1-\mu_{x_i^q,new}|^2}{(\sigma_{x_i^q,new})^2}}}{C''' e^{\frac{|-1-\mu_{x_i^q,new}|^2}{(\sigma_{x_i^q,new})^2}}} + \ln\frac{p(x_i^q = +1)}{p(x_i^q = -1)} =$$

$$-\frac{|-1-\mu_{x_i^q,new}|^2 - |+1-\mu_{x_i^q,new}|^2}{\left(\sigma_{x_i^q,new}\right)^2} + \ln\frac{p(x_i^q = +1)}{p(x_i^q = -1)} =$$

$$-\frac{4\mu_{x_i^q,new}}{\left(\sigma_{x_i^q,new}\right)^2} + \ln\frac{p(x_i^q = +1)}{p(x_i^q = -1)}.$$

The complexity of the determination of the transmitted signal based on the arrangement of the coefficients may be $N^3$. Further, the complexity of the integration may be $$\sum_{j=1}^{\log_2 N} \frac{N}{2^j} \sum_{i=2^{j-1}+1}^{2^j} (i^2) = \frac{7}{18}N^3 + \frac{3}{4}N^2 + \frac{1}{12}N \cdot \log_2 N - \frac{41}{36}N \cong \frac{7}{18}N^3.$$

Figure 8:
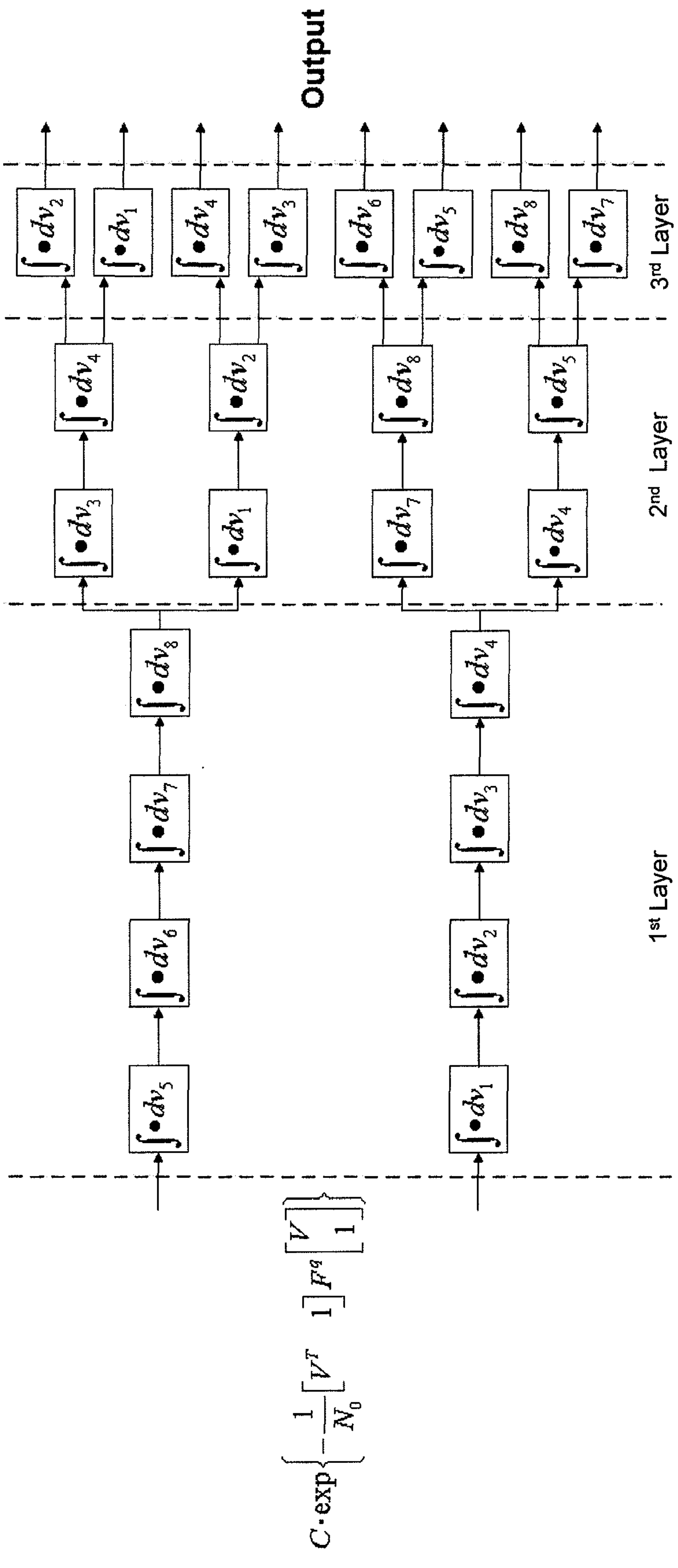

As a result, when combined with the division, the complexity may be on the order of $N^3$, and in particular $\frac{7}{18}N^3$. Similarly, FIG. 8 illustrates an example sequencing of grouped integration operations relative to a non-grouped sequencing in accordance with example embodiments of the present invention.

The integration procedure as described above may also be performed in an alternative manner. For example, a butterfly interleaving integration process may be used. A butterfly interleaving integration may reduce the times of integration and limit duplication of integration operations.

To perform the butterfly interleaving integration, the integration process may be written as:

$$\int \exp\left\{-\frac{1}{N_0}[V^T \;\; 1] f \begin{bmatrix} V \\ 1 \end{bmatrix}\right\} \cdot dv_t = C' \cdot \exp\left\{-\frac{1}{N_0}[V^T \;\; 1] f \begin{bmatrix} V \\ 1 \end{bmatrix}\right\},$$
$$\forall f \in C^{(N+1)\times(N+1)},\; t = 1 \ldots N$$

where the kth row, and the lth column element of f' is $$f'_{k,l} = \begin{cases} f_{k,l} - \frac{f_{k,t} f_{t,l}}{f_{t,t}}, & k \neq t \text{ and } l \neq t \\ 0, & \text{otherwise;} \end{cases}$$

$N_0$ is the noise power; V is the column vector, which is $[v_1\, v_2 \ldots v_N]$ and $v_i$, i=1 . . . N is the complex random variable; f' and f are matrix with complex element and size (N+1)×(N+1); t is an integer where t=1 . . . N; N is number of receive antennas; and k and l are variables where k,l=[1 . . . N]. To find the integral of $$C' \cdot \exp\left\{-\frac{1}{N_0}[V^T \;\; 1] f \begin{bmatrix} V \\ 1 \end{bmatrix}\right\}$$

with respect to an integration variable $v_1$, t may be set to one and $f=F_q$. As such based on the LLR as described above $$p(y^q \mid x_i^q = v_i) = \frac{\int_{v_1 \ldots v_{i-1}}\int_{v_{i+1}}\int_{\ldots v_N} C' \cdot \exp\left\{-\frac{1}{N_0}[V^T \;\; 1] f' \begin{bmatrix} V \\ 1 \end{bmatrix}\right\} \cdot dv_2 \ldots dv_{i-1} dv_{i+1} \ldots dv_N}{(C' \cdot \exp\{-[v_i - E[x_i^q]]^* [\mathrm{var}[x_i^q]]^{-1} [v_i - E[x_i^q]]\})}$$

where the kth row and lth column element of f' is $$f'_{k,l} = \begin{cases} F^q_{k,l} - \frac{F^q_{k,1} F^q_{1,l}}{F^q_{1,1}}, & k \neq 1 \text{ and } l \neq 1 \\ 0, & \text{otherwise.} \end{cases}$$

Figure 7:
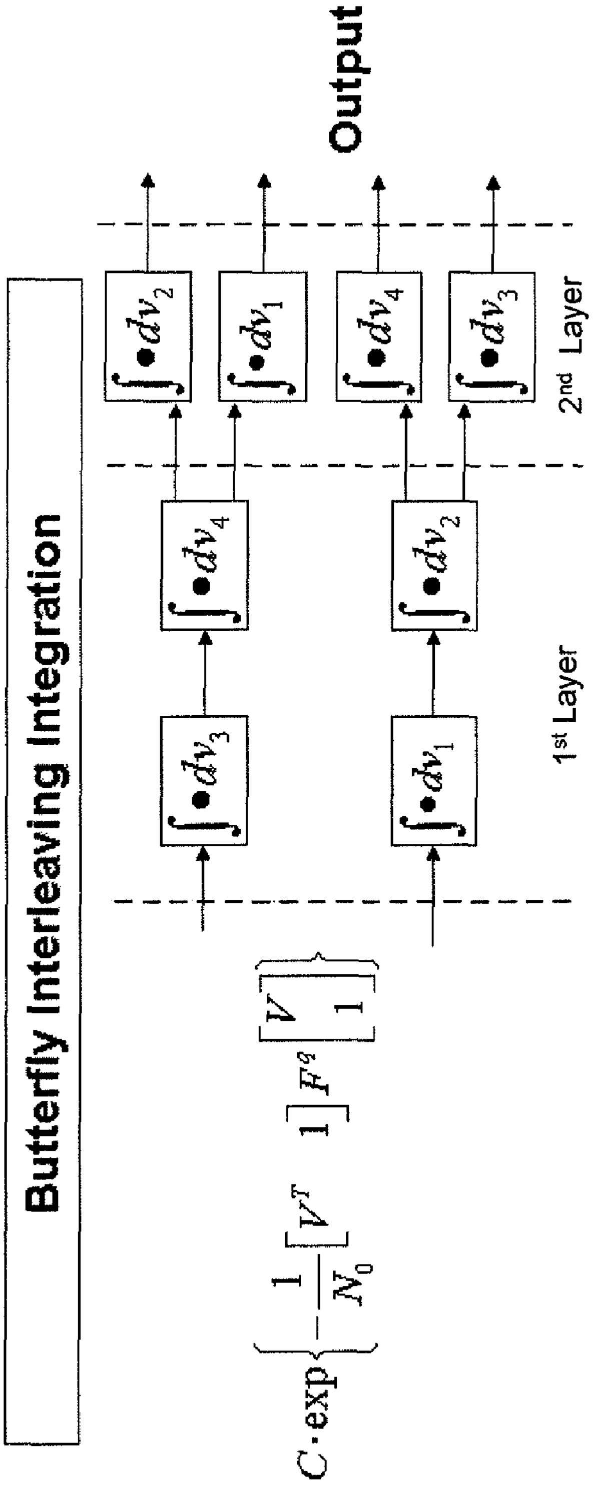
FIGS. 7-15 are an illustrations of example implementations of a butterfly interleaved integration procedure according to various example embodiments of the present invention.

An example of butterfly interleaving integration for N=4 is shown in FIG. 7. The block ∫·$dv_x$ indicates integration with variable $v_x$. In the left portion, $$C \cdot \exp\left\{-\frac{1}{N_0}[V^T \;\; 1] F^q \begin{bmatrix} V \\ 1 \end{bmatrix}\right\}$$

may be the input to find the integral. The integration operation may be divided into $\log_2 4=2$ layers. Blocks ∫·$dv_3$, ∫·$dv_4$, ∫·$dv_1$, and ∫·$dv_2$ may be a first layer and blocks ∫·$dv_2$, ∫·$dv_1$, ∫·$dv_3$, and ∫·$dv_4$ may be in a second layer. Accordingly, 4 $\log_2$ 4 integration operations may be required and the number of integrations may be reduced by a multiple of 4.

Further, another example butterfly interleaving integration for N=8 is show in FIG. 8. Since N=8, $\log_2 8=3$ layers may be used and, and 8 integration operations may be performed at each layer. Accordingly, only 8 $\log_2 8=24$ integrations may be required, resulting in a reduction of complexity on the order of one half.

In some example embodiments, identifying a solution using the butterfly interleaving integration may be performed in various ways depending on conditions of the data and expression to be integrated. In this regard, in some example embodiments, the expression to be integrated may be divided into two or more separate groups. For example, to decode the signals $\{x_A\, x_{A+1} \ldots x_B\}$, this set may be separated into a first set $\{x_A\, x_{A+1} \ldots x_k\}$ and a second set $\{x_{k+1}\, x_{k+2} \ldots x_B\}$. Operations performed with respect to these sets may be separated into a method for the condition where A, B, and k are positive integers and A<B and A≦k<B. By performing a series of butterfly integration operations, an integration of any grouping may be reduced to operations where either A=B, or A+1=B and A=k.

Figure 9:
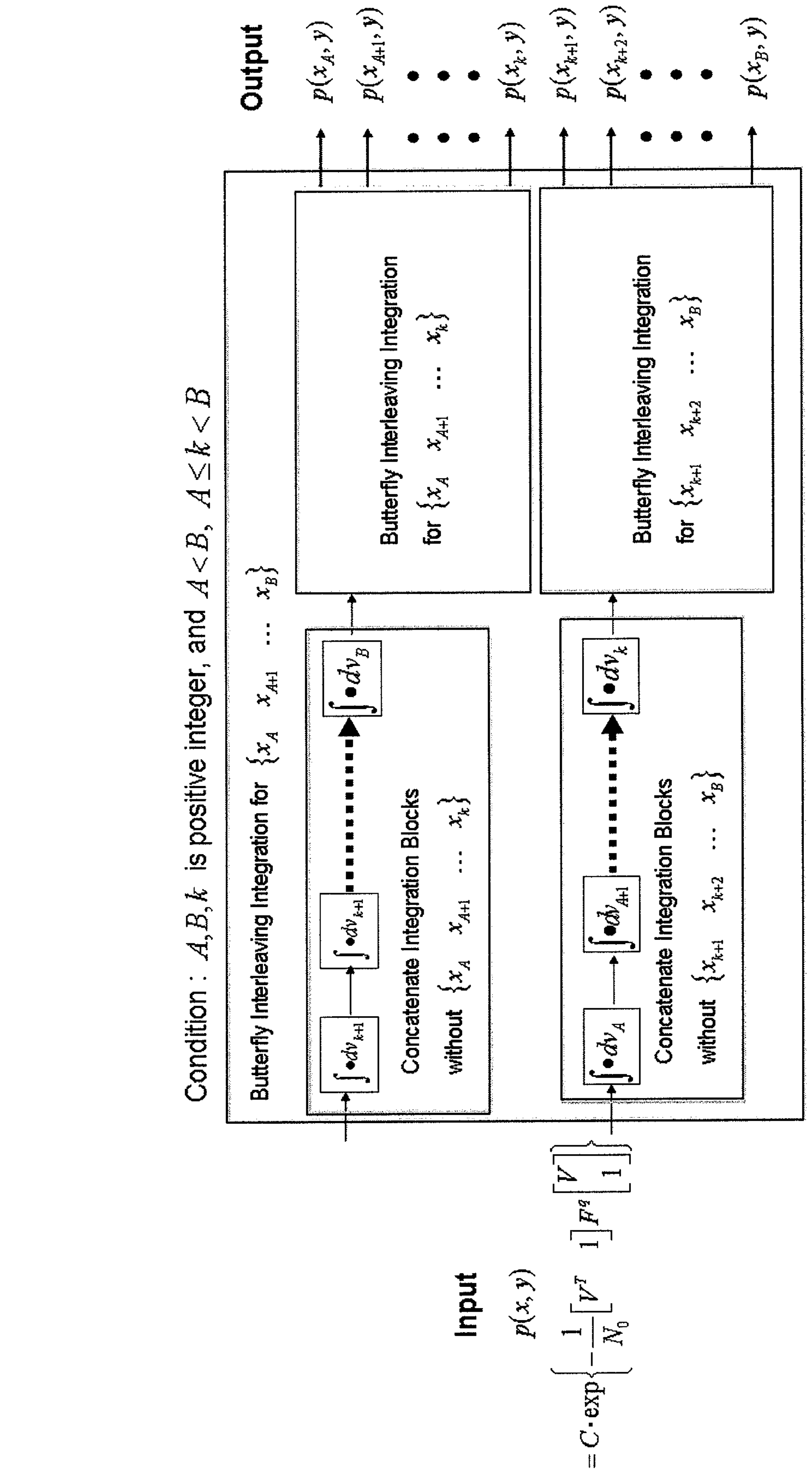

An example embodiment of the method, where sets are separated such that A, B, and k are positive integers and A<B and A≦k<B, is depicted in FIG. 9. As indicated in FIG. 9, prior to performing a butterfly interleaving integration with respect to each of the separated groups, a concatenation of integration blocks may occur. In this regard, a first concatenation may be performed with respect to the $\{x_A\, x_{A+1} \ldots x_k\}$ group and a second concatenation may be performed with regard to the $\{x_{k+1}\, x_{k+2} \ldots x_B\}$ group. The concatenation of integration blocks for the $\{x_A\, x_{A+1} \ldots x_k\}$ group may be performed with the members of the $\{x_A\, x_{A+1} \ldots x_k\}$, and the concatenation of integration blocks for the $\{x_{k+1}\, x_{k+2} \ldots$ $x_B\}$group may be performed with the members of the $\{x_{k+1}\ x_{k+2} \ldots x_B\}$, as depicted in FIG. 9. In other words, the concatenation of integration blocks for the group may be performed without inclusion of the members of the group. Upon concatenating the integration blocks in this manner, the butterfly interleaving integration may be performed with respect to each of the group as depicted in FIG. 9. In other words, the concatenation of integration blocks for the group may be performed without inclusion of the members of the group. Upon concatenating the integration blocks in this manner, the butterfly interleaving integration may be performed with respect to each of the group as depicted in FIG. 9.

Figure 10:
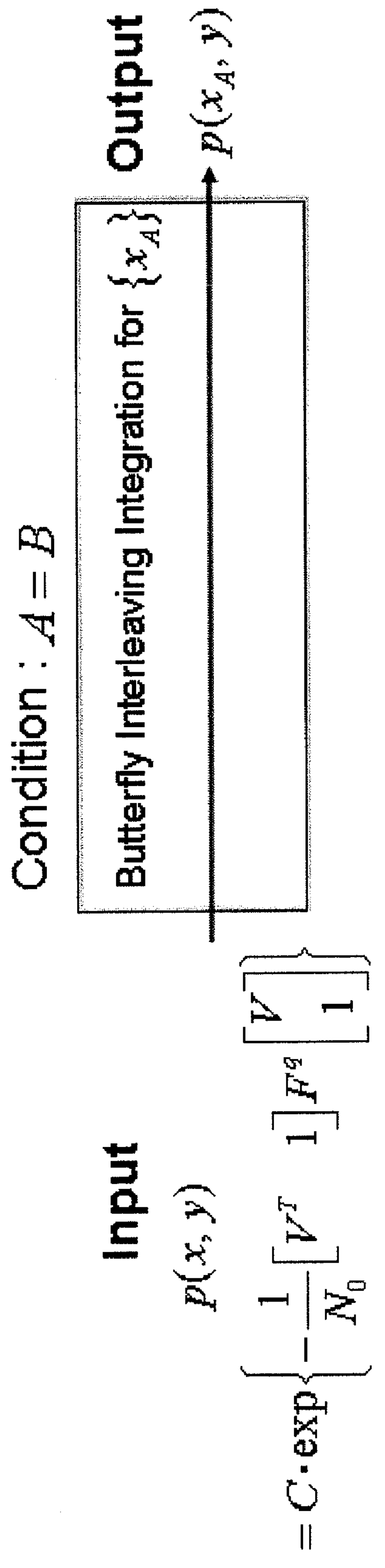
Figure 11:
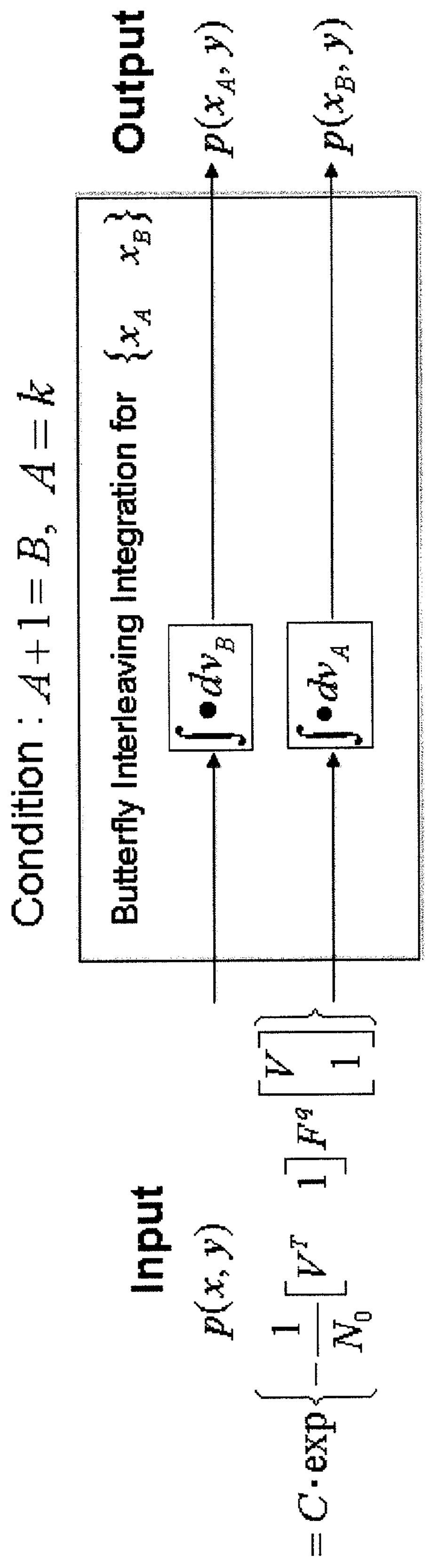

As described above, by generating separated groups, the butterfly interleaving integration process can be reduced to two basic unit operations depicted in FIGS. 10 and 11. The first may be where the sets are separated such that A=B, as depicted in FIG. 10, where butterfly interleaving integration is performed with respect to a single group member. Alternatively or additionally, where the sets are separated such that A+1=B and A=k, or two group members an integration with respect to the group members may be performed as depicted in FIG. 11.

Figure 12:
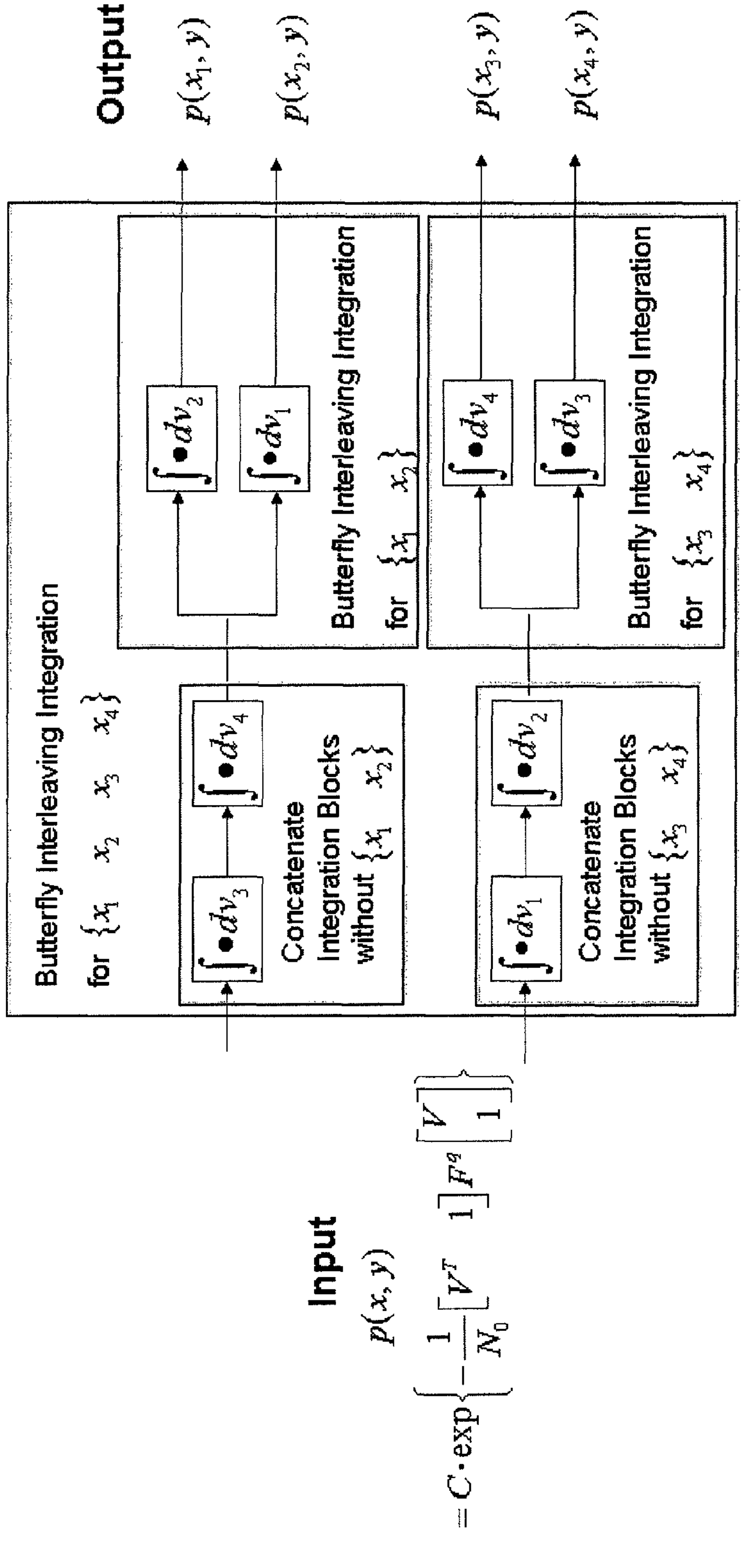

Referring again to example embodiments where A, B, and k are positive integers and A<B and A≦k<B, FIG. 12 depicts an example embodiment where A=1, B=4, and k=2. As such, the separated groups may be $\{x_1\ x_2\}$ and $\{x_3\ x_4\}$. FIG. 12 also depicts the concatenation of the integration blocks for the $\{x_1\ x_2\}$ integration as being performed without the group $\{x_1\ x_2\}$, and the concatenation of the integration blocks for the $\{x_3\ x_4\}$ integration as being performed without the group $\{x_3\ x_4\}$ Subsequently, the butterfly interleaving integration of $\{x_1\ x_2\}$ and $\{x_3\ x_4\}$ may be performed to determine $p(x_1, y)$, $p(x_2, y)$, $p(x_3,y)$, and $p(x_4, y)$, respectively. In this regard, since the separated groups reduce to two member groups, the process as described in FIG. 11 may be used to determine the solution.

Figure 13:
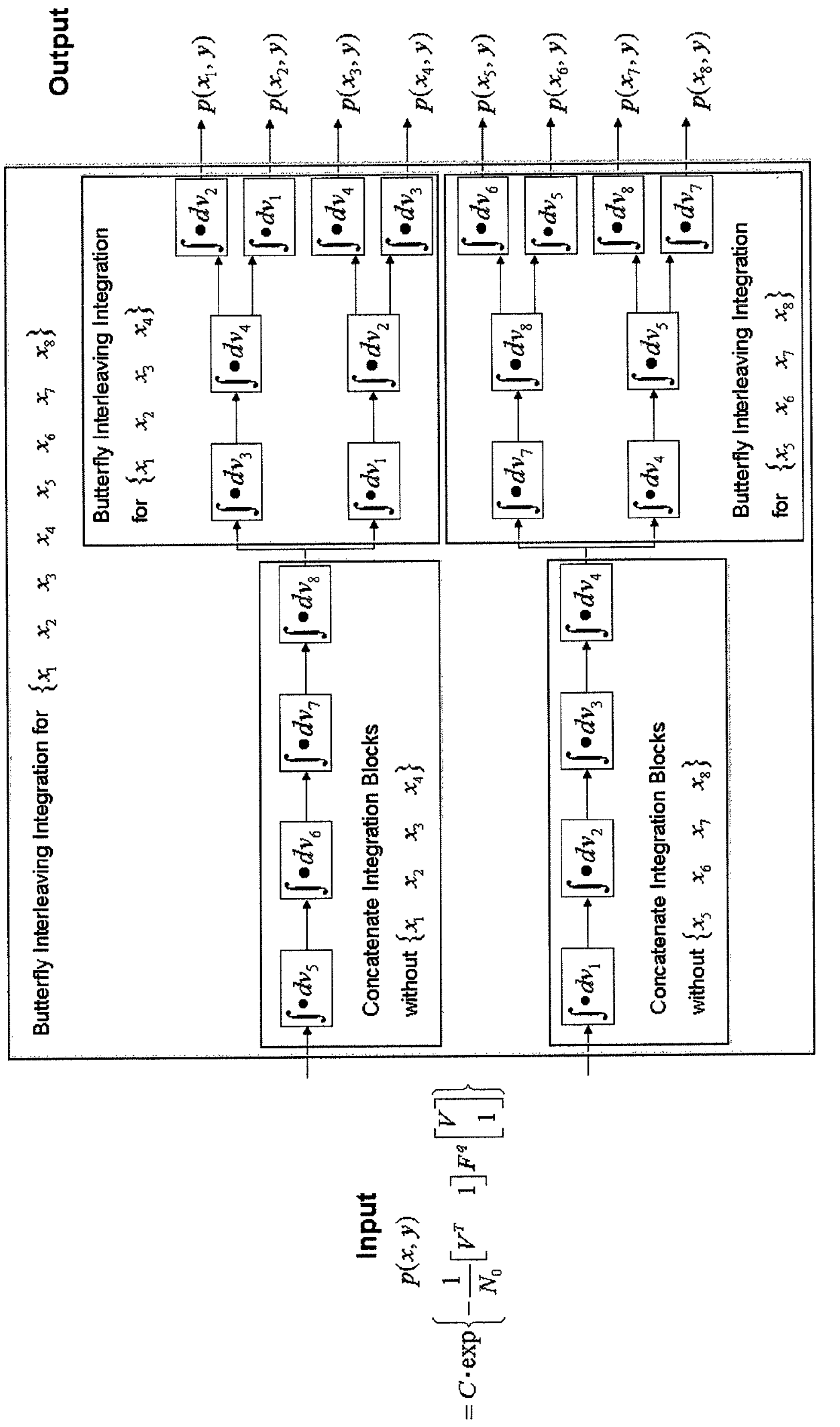

Referring to another example embodiment where A, B, and k are positive integers and A<B and A≦k<B, FIG. 13 depicts an example embodiment where A=1, B=8, and k=4. As such, the separated groups may be $\{x_1\ x_2\ x_3\ x_4\}$ and $\{x_5\ x_6\ x_7\ x_8\}$. FIG. 13 also depicts the concatenation of the integration blocks for $\{x_1\ x_2\ x_3\ x_4\}$ as being performed without the group $\{x_1\ x_2\ x_3\ x_4\}$, and the concatenation of the integration blocks for $\{x_5\ x_6\ x_7\ x_8\}$ as being performed without the group $\{x_5\ x_6\ x_7\ x_8\}$. Subsequently, the butterfly interleaving integration of $\{x_1\ x_2\ x_3\ x_4\}$ and $\{x_5\ x_6\ x_7\ x_8\}$ may be performed to determine $p(x_1, y)$ through $p(x_8, y)$, respectively. In this regard, since the separated groups reduce to four member groups, the process as described in FIG. 12 (and thereby the process described with respect to FIG. 11) may be used to determine the solution.

Figure 14:
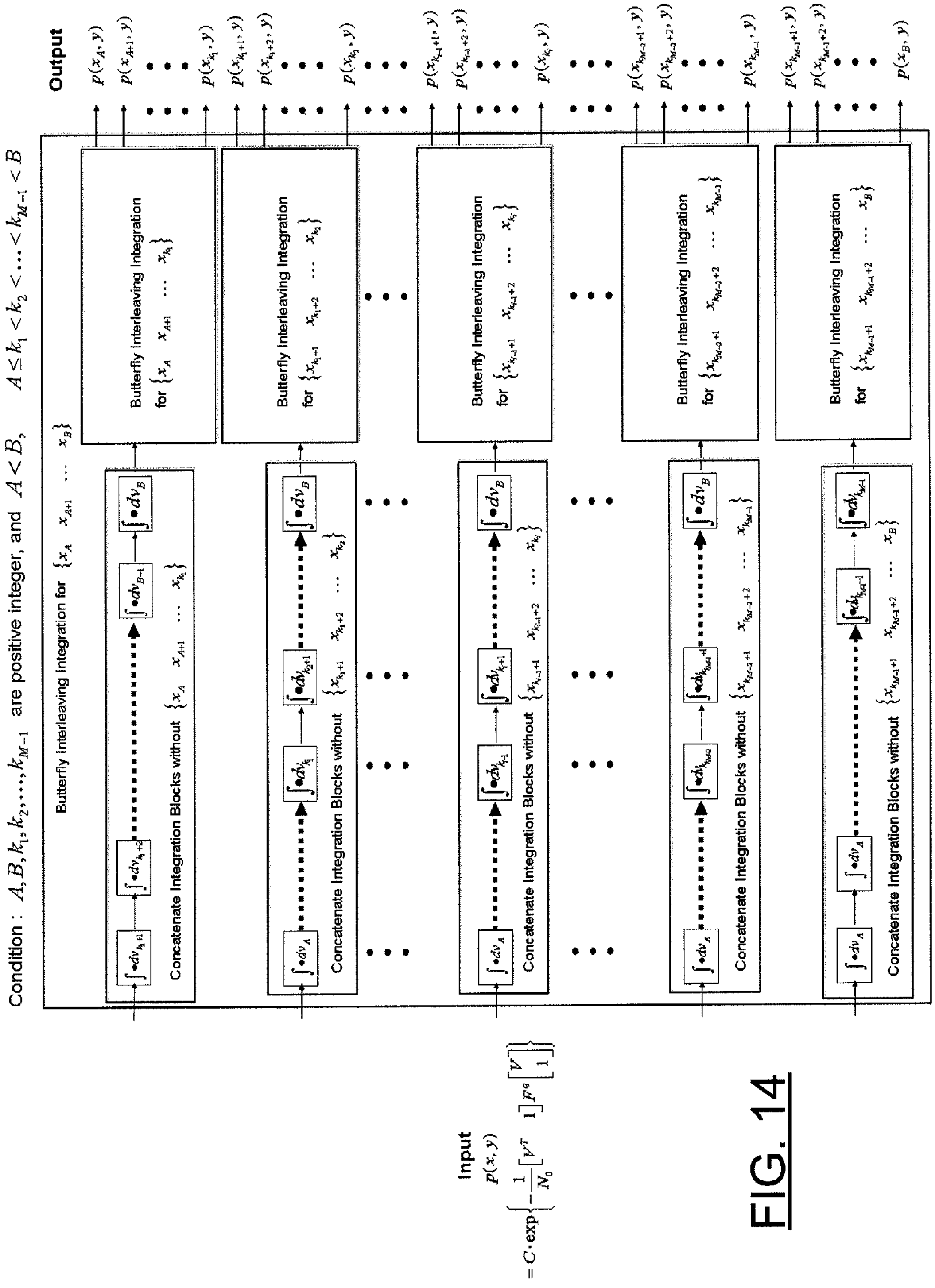

FIG. 14 depicts an example embodiment where the M separate groups are used to determine a solution. In this regard, the first group may be $\{x_A\ x_{A+1} \ldots x_k\}$, the second group maybe $\{x_{k_1+1}\ x_{k_1+2} \ldots x_{k_2}\}$, the ith group may be $\{x_{k_{i-1}+1}\ x_{k_{i-1}+2} \ldots x_{k_i}\}$, and the last group may be $\{X_{M_{i-1}+1}\ x_{M_{i-1}+2} \ldots x_{k_B}\}$. As depicted in FIG. 14, concatenation may be performed such that the members of the group for which the integration will be performed are not included in the concatenation. Again, the operations can be iteratively reduced to the basic unit operations described above.

Figure 15:
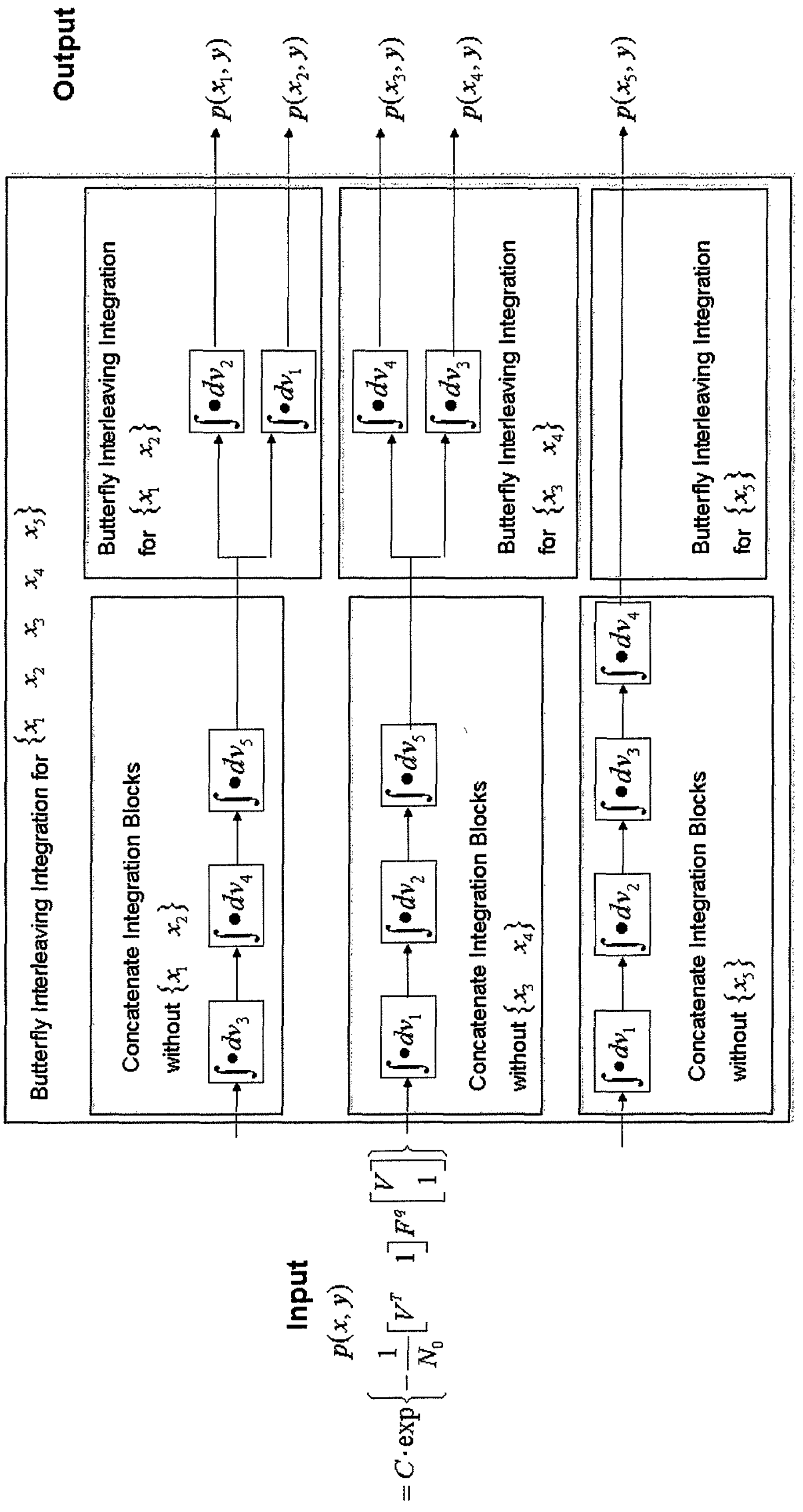

FIG. 15 depicts an example embodiment where A=1, B=5, M=3, $k_1=2$ and $k_2=4$. As such, the separated groups may be $\{x_1\ x_2\}$, $\{x_3\ x_4\}$, and $\{x_5\}$. FIG. 15 also depicts the concatenation of the integration blocks for the $\{x_1\ x_2\}$ integration as being performed without the group $\{x_1\ x_2\}$, and the concatenation of the integration blocks for the $\{x_3\ x_4\}$ integration as being performed without the group $\{x_3\ x_4\}$ With respect to the integration of $\{x_5\}$, the concatenation may be performed with all of the members, but $\{x_5\}$. Subsequently, the butterfly interleaving integration of $\{x_1\ x_2\}$ and $\{x_3\ x_4\}$ may be performed as depicted in FIG. 11, and the butterfly interleaving integration of $\{x_5\}$may be performed as depicted in FIG. 10.

To determine the complexity for evaluating $\{p(y^q|x_i^q)\}_{i=1}^N$ by butterfly interleaving integration, the initial value $F^q$ may be considered. The determination of the first Hermitian matrix contributes $N^2/2$ complexity. Additionally, since the expression includes an element that is uncorrelated with $E[x_k^q]$ and $var[x_k^q]$, the first iteration may be considered. The determination of the second Hermitian matrix contributes a complexity O(N), and therefore the second Hermitian matrix does not generate a bottleneck. As described above the butterfly interleaving integration results in $N \log_2 N$ integrations and since f' is also a Hermitian matrix, a complexity of $N^2/2$ results from evaluation of f'. The $t^{th}$ row and $t^{th}$ column of the matrix will be all zero after completing the integration with variable $v_t$, so the complexity decrease after each integration. Considered together, the total complexity may be $$\sum_{j=1}^{log_2 N} \frac{N}{2^j} \sum_{i=2^{j-1}+1}^{2^j} (i^2) = \frac{7}{18}N^3 + \frac{3}{4}N^2 + \frac{1}{12}N \cdot \log_2 N - \frac{41}{36}N \cong \frac{7}{18}N^3.$$

Further, if l is the number of decoding iterations, the total complexity may be $$\frac{N^3}{2} + l\frac{7}{18}N^3.$$

The description provided above illustrates an example method for decoding signals in a MIMO environment. FIG. 16*a* illustrates another example embodiment of the present invention in the form of an example apparatus that may be configured to detect and decode signals based on, for example, the methods described herein. The apparatus 200 of FIG. 16*a* may be configured to decode signals according to various example embodiments of the present invention. In particular, the apparatus 200 may be configured to receive a plurality of transmitted signals and decode the content of the transmitted signals as describe herein. In some example embodiments, the apparatus 200 may be embodied as, or included as a component of, a communications device with wired or wireless communications capabilities. Some examples of the apparatus 200 may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various example methods of the present invention, where the methods may be implemented by means of a hardware or software configured integrated circuit (e.g., a processor), computer-readable medium, or the like.

The apparatus 200 may include or otherwise be in communication with a processor 205, a memory device 210, and a communication interface 220. The processor 205 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an example embodiment, the processor 205 may be configured to execute instructions stored in the memory device 210 or instructions otherwise accessible to the processor 205. The stored or otherwise accessible instructions may be executed by the processor 205 to implement some example embodiments of the present invention. Processor 205 may also be configured to facilitate communications via the communications interface 220 by, for example, controlling hardware and/or software included in the communications interface 220.

The memory device 210 may be a computer-readable storage medium that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The communication interface 220 may be any device or means embodied in either hardware, software, or a combination of hardware and software that is configured to receive and/or transmit data from/to a network and/or any other device or module in communication with the apparatus 200. In this regard, the communication interface 220 may include, for example, an one or more antennas, a transmitter, a receiver, a transceiver and/or supporting hardware, including a processor or software for enabling communications with network 225. Via the communication interface 220 and the network 225, the apparatus 200 may communicate with various other network entities.

The communications interface 220 may be configured to provide for communications in accordance with any wired or wireless communication standard. The communications interface 220 may be configured to support communications in multiple antenna environments, such as MIMO environments. Further, the communications interface 220 may be configured to support orthogonal frequency division multiplexed (OFDM) signaling. In some example embodiments, the communications interface 220 may be configured to communicate in accordance with other techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 220 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The processor 205 of apparatus 200 may be any means or device embodied in hardware, or a combination of hardware and software, implementing software or hardware instructions that are configured to carry out the functions of the signal decoding as described herein. In an example embodiment, the processor 205 may include, or otherwise control a signal decoder.

According to various example embodiments, the processor 205 may be configured to decode a received plurality of multi-path signals and recover data content represented by transmitted signals. In some example embodiments, a complexity factor associated with decoding the received plurality of multi-path signals may be on the order of $N^3$. The processor 205 may be configured to generate a logarithm likelihood ratio (LLR) expression based on a received plurality or multi-path signals. In this regard, the multi-path signals may be representations of data content transmitted from a remote entity. In some example embodiments, the processor 205 may be configured to generate the LLR by analyzing extrinsic information as a continuous Gaussian function.

The processor 205 may also be configured to input representations of the received plurality of multi-path signals into an expression and arrange coefficients of the expression. The processor 205 may also be configured to integrate the expression, in some example embodiments, as a Gaussian function. In some example embodiments, being configured to integrate the expression may include being configured to perform $N(N-1)$ integration operations to integrate the expression and/or evaluating a multiple integral of the expression. In some example embodiments, the processor 205 may be configured to identify duplicated integration operations and group the duplicated operations such that a single integration is performed with respect to each group. The processor 205 may also be configured to divide the integrated expression by prior information to facilitate the decoding and recovery of the data content represented by the plurality of multi-path signals. Further, according to various example embodiments the processor 205 may be configured to integrate the expression in layers using a butterfly interleaving integration procedure where one or more layers of the procedure include $N \log_2 N$ number of integration operations.

FIG. **16*b* depicts another example embodiment of the present invention in the form of an apparatus 201. The apparatus 202 may be a hardware device (e.g., circuitry, an integrated circuit, or a chip) configured to perform the various aspects of the invention described above. The communications interface 220 and the network 225 of FIG. 16*b* may be configured as described above with respect to FIG. 16*a*. The signal detector 230 may comprise circuitry that may be defined with respect to the functionality performed by the circuitry. The circuitry of the signal detector 230 may be configured to perform the functionality described with respect to processor 205** described above.

FIG. 16*c* illustrates one example functional block diagram of a configuration of the signal detector 230 of FIG. 16*b*. In this regard, representations of the received plurality of multi-path signals may be received via the signal input 255. The signal detector 230 may also include an additional input 260 for prior information. Upon receipt of the representations of the received plurality of multi-path signals via signal input 255, representations of the signals may be evaluated to determine $p(y^q|x^q)$ via the $p(y^q|x^q)$ evaluation circuitry 275. The prior information may also be evaluated as an input to determine $p(x^q)$ via the $p(x^q)$ evaluation circuitry 265. Additionally, the prior information may be evaluated as an input to determine the LLR via LLR circuitry 290. The $p(y^q, x^q)$ evaluation circuitry 270 may be configured to evaluate $p(y^q|x^q)$ and $p(x^q)$, in preparation for integration as described herein. In some example embodiments, the $p(x^q)$ evaluation circuitry 265, the $p(y^q|x^q)$ evaluation circuitry 275, and the $p(y^q, x^q)$ evaluation circuitry 270 may be referred to collectively as probability evaluation circuitry.

Integration may be performed via various means as described above. In the example embodiment illustrated in FIG. 16*c*, the butterfly interleaving integration circuitry 280 may be configured to integrate and expression provided by the $p(y^q, x^q)$ evaluation circuitry 270. In this regard, the butterfly interleaving integration circuitry 280 may be configured to concatenate integration blocks as described above and with respect to FIG. 14. The butterfly interleaving integration circuitry 280 may be configured to perform a butterfly interleaving integration as described above and with respect to FIG. 14. Upon integration, the dividing integrated expression circuitry 285 may be configured to generate $p(y^q|x_i^q)$ based on the integrated output provided by the butterfly interleaving integration circuitry 280 and $p(x^q)$ provided by $p(x^q)$ evaluation circuitry 265. After dividing integration expression circuitry 285, the LLR circuitry 290 may be configured to generate a logarithm likelihood ratio expression based on the divided and integrated expression output provided by the dividing integration expression circuitry 285 and prior information provided by input 260. The output of the LLR circuitry 290 may be an output 295 of the signal detector 230. In some example embodiments, the output 295 may, but need not, provide an output in the form of extrinsic information. Accordingly, signal detector 230 may be configured to output a decoded version of the received plurality of multi-path signals.

FIG. 17 illustrates a flowchart of a system, method, and computer program product according to example embodiments of the invention. It will be understood that each block, step, or operation of the flowchart, and/or combinations of blocks, steps, or operations in the flowchart, can be implemented by various means. Means for implementing the blocks, steps, or operations of the flowchart, and/or combinations of the blocks, steps or operations in the flowcharts may include hardware, firmware, and/or instructions stored on a computer-readable storage medium, including one or more computer program code instructions, program instructions, or executable computer-readable program code instructions. In one example embodiment, one or more of the procedures described herein may be embodied by program code instructions stored on a computer-readable storage medium. In this regard, the program code instructions which embody the procedures described herein may be stored by or on a memory device, such as memory device 210, of an apparatus, such as apparatus 200, and executed by an integrated circuit, such as the processor 205. As will be appreciated, any such program code instructions may be loaded from the memory device onto a computer or other programmable apparatus (e.g., processor 205 or memory device 210) to produce a machine, such that the instructions which execute on the computer or other programmable apparatus configure the computer or other programmable apparatus to be a means for implementing the functions specified in the flowchart's block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified in the flowchart's block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowchart support combinations of means for performing the specified functions, combinations of steps for performing the specified functions, and program code instruction means for performing the specified functions. It will also be understood that one or more blocks, steps, or operations of the flowchart, and combinations of blocks, steps, or operations in the flowchart, can be implemented by special purpose hardware-based computer systems which perform the specified functions or steps, or combinations of special purpose hardware and program code instructions.

FIG. 17 depicts a flowchart describing an example method of the present invention for decoding a plurality of multi-path signals. At 300, the example method includes generating $p(x^q)$ based on prior information. At 310, the example method may also include generating $p(y^q|x^q)$based on a plurality of received multi-path signals. At 320, $p(y^q,x^q)$ may be generated based on $p(x^q)$ and $p(y^q|x^q)$. In this regard, the example method may include arranging coefficients of an expression generated at 320.

At 330, the example method may further include integrating an expression, for example as a multiple integral of the expression. In some example embodiments, integrating the expression may include performing $N(N-1)$ integration operations, where N is a number of receive antennas. In other example embodiments, the method may include grouping integration operations based on duplicated operations such that a single integration operation is performed for a respective group. Further, according to various example embodiments integrating the expression may be performed in layers using a butterfly interleaving integration procedure where, in some example embodiments, one or more layers of the procedure include $N \log_2 N$ number of integration operations.

Further, at 340, the example method may include dividing the integrated expression by prior information $p(x^q)$. In some example embodiments, dividing the integrated expression may include evaluating the integrated expression as a Gaussian function. The example method may also include generating a LLR expression. In some example embodiments, generating the LLR expression may include analyzing an extrinsic information portion of the expression as a continuous Gaussian function. The LLR integration may be based on the output integration. In the aggregate, the operations described with respect to FIG. 17 are performed to thereby decode the received plurality of multi-path signals and recover the transmitted data content. In some example embodiments, one or more of the operations described in FIG. 17 may be performed by a processor, such as processor 205, or another type of integrated circuit, such as an ASIC.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:

receiving a plurality of multi-path signals and inputting representations of the received plurality of multi-path signals into an expression, the plurality of multi-path signals being representations of transmitted data content;

arranging coefficients of the expression;

integrating the expression; and dividing the integrated expression by prior information to generate a result;

generating a logarithm likelihood ratio based on the prior information and the result;

wherein, arranging, integrating, dividing, and generating are performed to thereby decode the received plurality of multi-path signals and recover the data content, and wherein at least one of arranging, integrating, dividing, and generating are performed by a processor.

2. The method of claim 1, wherein a complexity factor of decoding the received plurality of multi-path signals is on an order of $N^3$, where N represents a number of transmit antennas.

3. The method of claim 1, wherein generating the logarithm likelihood ratio includes analyzing an extrinsic information portion as a continuous Gaussian function, the extrinsic information portion being a logarithm of a probability ratio.

4. The method of claim 1, wherein integrating the expression includes performing the integration in a series of layers via butterfly interleaving integration.

5. The method of claim 4, wherein integrating the expression includes generating two or more groups and performing a butterfly interleaving integration with respect to each of the groups, wherein when a group includes more than one member, a concatenation of integration blocks for non-group members is performed.

6. The method of claim 1, wherein integrating the expression includes performing a concatenation of integration blocks associated with the expression and performing a butterfly interleaving integration on the concatenated integration blocks.

7. The method of claim 1, wherein integrating the expression includes evaluating a multiple integral of the expression, the expression being a product of a plurality of probabilities.

8. The method of claim 1, wherein integrating the expression includes grouping integration operations based on duplicated operations such that a single integration operation is performed for a respective group.

9. The method of claim 1, wherein integrating the expression includes performing the integration according to $$\int \exp\left\{-\frac{1}{N_0}[V^T \;\; 1]f\begin{bmatrix} V \\ 1 \end{bmatrix}\right\}\cdot dv_t = C'\cdot\exp\left\{-\frac{1}{N_0}[V^T \;\; 1]f'\begin{bmatrix} V \\ 1 \end{bmatrix}\right\},$$
$$\forall f \in C^{(N+1)\times(N+1)},\ t = 1 \ldots N$$

where the kth row, and the lth column element of f' is $$f'_{k,l} = \begin{cases} f_{k,l} - \dfrac{f_{k,t}f_{t,l}}{f_{t,t}}, & k \neq t \text{ and } l \neq t \\ 0, & \text{otherwise,} \end{cases}$$

$N_0$ is noise power, V is a column vector $[v_i]^T$ where i=1. . . N and $v_i$ is a complex random variable, f' and f are matrices with complex elements and size (N +1) ×(N +1), t is an integer where t =1. . . N, N is a number of receive antennas, and k and l are variables where k, l=1. . . N.

10. An integrated circuit for signal decoding, the integrated circuit comprising:

probability evaluation circuitry that receives representations of a plurality of multi-path signals and generates an expression based on the representations of the plurality of multi-path signals and prior information;

butterfly interleaving integration circuitry that generates two or more groups based on the expression, performs a concatenation of integration blocks for non-group members of each group, and performs a butterfly interleaving integration of each group to generate an integrated expression;

dividing integrated expression circuitry that divides the integrated expression by the prior information to generate a result; and logarithmic likelihood ratio (LLR) circuitry that generates a logarithm likelihood ratio expression based on the result to thereby decode the received plurality of multi-path signals and recover data content.

11. The integrated circuit of claim 10, wherein the integrated circuit decodes the received plurality of multi-path signals with a complexity factor on an order of $N^3$, where N represents a number of transmit antennas.

12. The integrated circuit of claim 10, wherein the probability evaluation circuitry analyzes an extrinsic information portion of the expression as a continuous Gaussian function, the extrinsic information portion being a logarithm of a probability ratio.

13. The integrated circuit of claim 10, wherein the butterfly interleaving integration circuitry performs the integration in a series of layers.

14. The integrated circuit of claim 10, wherein the butterfly interleaving integration circuitry performs a concatenation of integration blocks for non-group members, when a group includes more than one member.

15. The apparatus of claim 10, wherein the butterfly interleaving integration circuitry performs the integration according to $$\int \exp\left\{-\frac{1}{N_0}[V^T \;\; 1]f\begin{bmatrix} V \\ 1 \end{bmatrix}\right\}\cdot dv_t = C'\cdot\exp\left\{-\frac{1}{N_0}[V^T \;\; 1]f'\begin{bmatrix} V \\ 1 \end{bmatrix}\right\},$$
$$\forall\, f \in C^{(N+1)\times(N+1)},\; t = 1 \ldots N$$

where the kth row, and the lth column element of f' is $$f'_{k,l} = \begin{cases} f_{k,l} - \dfrac{f_{k,t} f_{t,l}}{f_{t,t}}, & k \neq t \text{ and } l \neq t \\ 0, & \text{otherwise,} \end{cases}$$

$N_0$ is noise power, V is a column vector $[v_i]^T$ where i =1. . . N and $v_i$ is a complex random variable, f' and f are matrices with complex elements and size (N +1) ×(N +1), t is an integer where t =1. . . N, N is a number of receive antenna, and k and l are variables where k, l=1. . . N.

16. A computer program product comprising at least one non-transitory computer-readable storage medium having executable computer-readable program code instructions stored therein, the computer-readable program code instructions configured to:

receive a plurality of multi-path signals and input representations of the received plurality of multi-path signals into an expression, the plurality of multi-path signals being representations of transmitted data content;

arrange coefficients of the expression;

integrate expression; and divide the integrated expression by prior information to generate a result;

generate a logarithm likelihood ratio based on the prior information and the result to thereby decode the received plurality of multi-path signals and recover the data content.

17. The computer program product of claim 16, wherein the computer-readable instructions configured to decode the received plurality of multi-path signals include being configured to decode the received plurality of multi-path signals with a complexity factor on an order of $N^3$, where N represents a number of transmit antennas.

18. The computer program product of claim 16, wherein the computer-readable instructions configured to generate the logarithm likelihood ratio include being configured analyze an extrinsic information portion as a continuous Gaussian function, the extrinsic information portion being a logarithm of a probability ratio.

19. The computer program product of claim 16, wherein the computer-readable program code instructions configured to integrate the expression include being configured to perform the integration in a series of layers via butterfly interleaving integration.

20. The computer program product of claim 19, wherein the computer-readable program code instructions configured to integrate the expression include being configured to generate two or more groups and perform a butterfly interleaving integration with respect to each of the groups, wherein when a group includes more than one member, the computer-readable program code instructions are configured to perform a concatenation integration blocks for non-group members.

21. The computer program product of claim 16, wherein the computer-readable instructions configured to integrate the expression include being configured to evaluate a multiple integral of the expression, the expression being a product of a plurality of probabilities.

22. The computer program product of claim 16, wherein the computer-readable instructions configured to integrate the expression include being configured to group integration operations based on duplicated operations such that a single integration operation is performed for a respective group.

23. The computer program product of claim 16, wherein the computer-readable program code instructions configured to integrate the expression include being configured to perform the integration according to $$\int \exp\left\{-\frac{1}{N_0}[V^T \;\; 1]f\begin{bmatrix} V \\ 1 \end{bmatrix}\right\}\cdot dv_t = C'\cdot\exp\left\{-\frac{1}{N_0}[V^T \;\; 1]f'\begin{bmatrix} V \\ 1 \end{bmatrix}\right\},$$
$$\forall\, f \in C^{(N+1)\times(N+1)},\; t = 1 \ldots N$$

where the kth row, and the lth column element of f' is $$f'_{k,l} = \begin{cases} f_{k,l} - \dfrac{f_{k,t} f_{t,l}}{f_{t,t}}, & k \neq t \text{ and } l \neq t \\ 0, & \text{otherwise,} \end{cases}$$

$N_0$ is noise power, V is a column vector $[v_i]^T$ where i =1. . . N and $v_i$ is a complex random variable, f' and f are matrices with complex elements and size (N +1) ×(N +1), t is an integer where t =1. . . N, N is a number of receive antenna, and k and l are variables where k, l=1. . . N.

* * * * *

UNITED STATES PATENT AND TRADEMARK OFFICE

CERTIFICATE OF CORRECTION

PATENT NO. : 8,259,856 B2
APPLICATION NO. : 12/409770
DATED : September 4, 2012
INVENTOR(S) : Wang et al.

It is certified that error appears in the above-identified patent and that said Letters Patent is hereby corrected as shown below:

On the Title page,
Item (75) Inventors: “Huan-Chuan Wang” should read --Huan-Chun Wang--.

Signed and Sealed this
Ninth Day of April, 2013

Teresa Stanek Rea
*Acting Director of the United States Patent and Trademark Office*